(12) United States Patent
Mullick et al.

(10) Patent No.: US 10,975,197 B2
(45) Date of Patent: Apr. 13, 2021

(54) ESTER-LINKED SURFACE MODIFYING MACROMOLECULES

(71) Applicant: Evonik Canada Inc., Burlington (CA)

(72) Inventors: Sanjoy Mullick, Brampton (CA); J. Paul Santerre, Whitby (CA); Jeannette Ho, Toronto (CA)

(73) Assignee: Evonik Canada Inc., Burlington (CA)

( * ) Notice: Subject to any disclaimer, the term of this patent is extended or adjusted under 35 U.S.C. 154(b) by 0 days.

(21) Appl. No.: 15/536,722

(22) PCT Filed: Dec. 16, 2015

(86) PCT No.: PCT/CA2015/051333
§ 371 (c)(1),
(2) Date: Jun. 16, 2017

(87) PCT Pub. No.: WO2016/095042
PCT Pub. Date: Jun. 23, 2016

(65) Prior Publication Data
US 2017/0369646 A1     Dec. 28, 2017

Related U.S. Application Data

(60) Provisional application No. 62/092,700, filed on Dec. 16, 2014.

(51) Int. Cl.
| | | |
|---|---|---|
| C08G 65/26 | (2006.01) | |
| C09D 7/65 | (2018.01) | |
| C09D 5/16 | (2006.01) | |
| C08G 65/329 | (2006.01) | |
| C08G 65/332 | (2006.01) | |
| C08G 65/336 | (2006.01) | |
| C08G 65/337 | (2006.01) | |

(52) U.S. Cl.
CPC ....... *C08G 65/2609* (2013.01); *C08G 65/329* (2013.01); *C08G 65/336* (2013.01); *C08G 65/337* (2013.01); *C08G 65/3322* (2013.01); *C09D 5/1637* (2013.01); *C09D 7/65* (2018.01)

(58) Field of Classification Search
CPC C08G 65/2609; C08G 65/329; C08G 65/336; C08G 65/3322; C08G 65/337; C08G 77/385; C08G 77/46
See application file for complete search history.

(56) References Cited

U.S. PATENT DOCUMENTS

| | | | |
|---|---|---|---|
| 5,468,365 A | 11/1995 | Menchen et al. | |
| 2003/0001130 A1* | 1/2003 | Qiu | C07C 311/09 252/8.62 |
| 2011/0124782 A1* | 5/2011 | Dams | C07C 69/708 524/131 |

(Continued)

FOREIGN PATENT DOCUMENTS

| | | |
|---|---|---|
| CA | 2439225 A1 | 9/2002 |
| EP | 0293863 A2 | 12/1988 |
| EP | 0327906 A1 | 8/1989 |

(Continued)

OTHER PUBLICATIONS

International Search Report and Written Opinion for International Application No. PCT/CA2015/051333, dated Mar. 22, 2016 (10 pages).

(Continued)

*Primary Examiner* — Kuo Liang Peng
(74) *Attorney, Agent, or Firm* — Linda S. Li; Jason S. Ngui

(57) ABSTRACT

The invention relates to ester-linked surface-modifying macromolecules and admixtures thereof as shown below by the representative compounds. The admixtures can be used in industrial and medical applications where enhanced surface properties are desirable (e.g., surface properties reducing or preventing biofouling, immobilization of biomolecules, or denaturation of certain biomolecules).

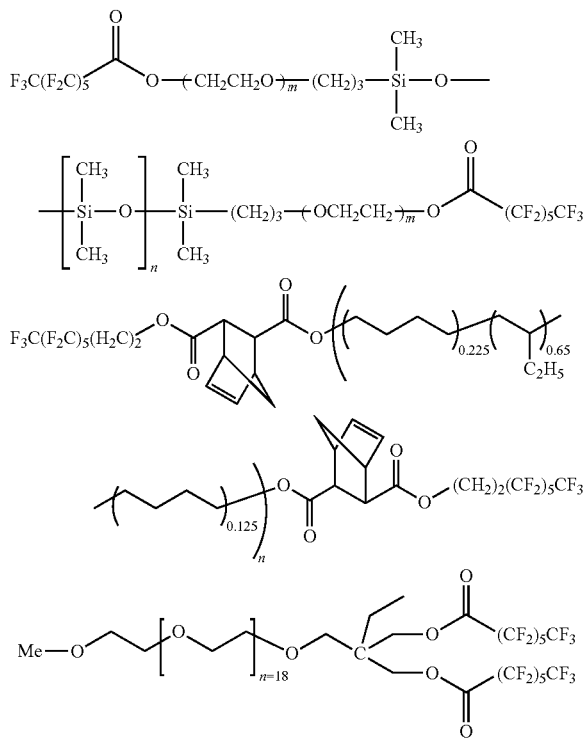

59 Claims, 6 Drawing Sheets

(56) References Cited

U.S. PATENT DOCUMENTS

2015/0344748 A1    12/2015    Wohl et al.

FOREIGN PATENT DOCUMENTS

| EP | 0333083 A2 | 9/1989 |
| EP | 1454929 B1 | 11/2009 |
| WO | WO-2010/009191 A2 | 1/2010 |

OTHER PUBLICATIONS

Urquhart et al., "TOF-SIMS analysis of a 576 micropatterned copolymer array to reveal surface moieties that control wettability," Anal Chem. 80(1):135-42 (2008).

Wohl et al., "Synthesis and surface characterization of copoly(imide alkyl ether)s containing pendant fluoroalkyl groups," J Appl Polym Sci. 132(9):41538 (2015) (11 pages).

* cited by examiner

Compound 1 (m = 25)

Compound 2 m = 12-16

Compound 3

Compound 4

Compound 5

Compound 6

Compound 7

Compound 8

Compound 9

ESTER-LINKED SURFACE MODIFYING MACROMOLECULES

FIELD OF THE INVENTION

The invention relates to surface-modifying macromolecules and admixtures thereof with base polymers. The admixtures can be used in applications where enhanced surface properties (e.g., surface properties reducing or preventing biofouling, immobilization of biomolecules, or denaturation of certain biomolecules) are desired, e.g., in industrial and medical applications.

BACKGROUND OF THE INVENTION

Wetted surfaces can be susceptible to interaction with biological agents, such as proteins, nucleic acids, and living organisms. These interactions can lead to degradation of adsorption of the biological agent (e.g., a protein or a nucleic acid). These interactions can also lead to surface fouling by water constituents such as biomolecules, living organisms (e.g., bacteria), dissolved inorganic or organic compounds, colloids, and suspended solids. Biofouling can be attributable to accumulated extracellular materials such as soluble microbial products and extracellular polymeric substances such as polysaccharides and proteins (see, e.g., Asatekin et al., *Journal of Membrane Science*, 285:81-89, 2006). For example, membranes that are used for industrial water filtration or in medical applications (e.g., in dialysis) can suffer fouling due to e.g., adsorption of proteins, attachment of suspended particles, or precipitated salts to the membrane. Still other examples of fouling in biomedical applications can generally result from the adherence of, e.g., cells and pathogens to the surface of a medical device (e.g., a catheter or other implantable medical device), and such fouling can have potentially adverse outcomes. Fouling can also be evident on the hulls of marine vessels, which can become coated with marine organisms or their secretions.

Accordingly, compositions and admixtures that have surface properties reducing or preventing biofouling, immobilization of biomolecules, or denaturation of certain biomolecules can be useful in diverse applications in industry and medicine.

SUMMARY OF THE INVENTION

In general, the present invention provides ester-linked surface-modifying macromolecules.

In a first aspect, the invention provides a compound of formula (I):

$$F_T-L_1-O \diagdown \diagup X_1 \quad (I)$$
$$X_3-L_2-O \diagup \diagdown O-[\cdots O \cdots]_n O-X_2,$$

where
each $F_T$ is independently a surface active group selected from the group consisting of polydimethylsiloxanes, hydrocarbons, polyfluoroorgano, and combinations thereof;
$X_1$ is H, $CH_3$, or $CH_2CH_3$;
each of $X_2$ and $X_3$ is independently H, $CH_3$, $CH_2CH_3$, or $F_T$;

each of $L_1$ and $L_2$ is independently a bond, an oligomeric linker, or a linker with two terminal carbonyls; and
n is an integer from 5 to 50.

In formula (I), each of $L_1$ and $L_2$ can be a bond. Each of $L_1$ and $L_2$ can be a linker with two terminal carbonyls. Each of $L_1$ and $L_2$ can be an oligomeric linker. The oligomeric linker can include (alkylene oxide), (e.g., (ethylene oxide)$_z$), in which z is an integer from 2 to 20 (e.g., from 2 to 18, from 2 to 16, from 2 to 14, or from 2 to 12).

In formula (I), the compound can have a structure of formula (I-A):

$$(I-A)$$

in which each of m1 and m2 is independently an integer from 0 to 50.

In formula (I-A), m1 can be 5, 6, 7, 8, 9, or 10. In formula (I-A), m2 can be 5, 6, 7, 8, 9, or 10. In formula (I-A), m1 can be equal to m2 (e.g., each of m1 and m2 can be 6, or each of m1 and m2 can be 0).

In formula (I) or (I-A), n is 5, 6, 7, 8, 9, or 10 (e.g., n can be 8).

In formula (I) or (I-A), $X_2$ can be H, $CH_3$, or $CH_2CH_3$. In formula (I) or (I-A), $X_2$ can be $F_T$. In formula (I) or (I-A), $X_3$ can be $F_T$. Each $F_T$, when present, can be independently a polyfluoroorgano group. For example, each $F_T$, when present, can be independently $-(O)_q-[C(=O)]_r-(CH_2)_o(CF_2)_pCF_3$,
in which
q is 0, and r is 1, or q is 1, and r is 0;
o is from 0 to 2; and
p is from 0 to 10;
provided that the compound does not contain $-O-O-$.
In formula (I) or (I-A), each $F_T$ can contain $(CF_2)_5CF_3$. In formula (I) or (I-A), $X_1$ can be $CH_2CH_3$.

In a second aspect, the invention provides a compound of formula (II), $$(II)$$
$$F_T-L_1-O \diagdown \diagup O-[\cdots O \cdots]_{n1} O-X_1$$
$$X_3-L_2-O \diagup \diagdown O-[\cdots O \cdots]_{n2} O-X_2,$$

in which
each $F_T$ is independently a surface active group selected from the group consisting of polydimethylsiloxanes, hydrocarbons, polyfluoroorgano, and combinations thereof;
each of $X_1$, $X_2$, and $X_3$ is independently H, $CH_3$, $CH_2CH_3$, or $F_T$;
each of $L_1$ and $L_2$ is independently a bond, an oligomeric linker, or a linker with two terminal carbonyls; and
each of n1 and n2 is independently an integer from 3 to 50.

In formula (II), each of $L_1$ and $L_2$ can be a bond. In formula (II), each of $L_1$ and $L_2$ can be a linker with two terminal carbonyls. In formula (II), each of $L_1$ and $L_2$ can be norbornene-dicarbonyl or terephthaloyl. In formula (II), each of $L_1$ and $L_2$ can be an oligomeric linker. In formula (II), the oligomeric linker can contain (alkylene oxide), (e.g., (ethylene oxide)$_z$), in which z can be an integer from 2 to 20 (e.g., from 2 to 18, from 2 to 16, from 2 to 14, or from 2 to 12).

In formula (II), the compound can have a structure of formula (II-A),

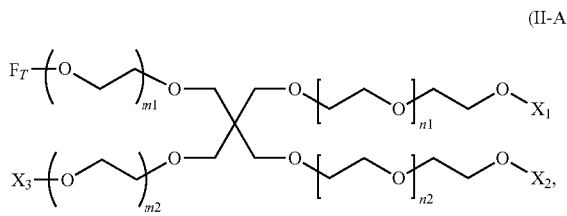
(II-A)

in which each of m1 and m2 is independently an integer from 0 to 50.

In formula (II-A), m1 can be 5, 6, 7, 8, 9, or 10. In formula (II-A), m2 can be 5, 6, 7, 8, 9, or 10. In formula (II), m1 can be equal to m2 (e.g., each of m1 and m2 can be 3). In formula (II-A), the sum of n1, n2, m1, and m2 can be an integer from 5 to 15.

In formula (II) or (II-A), n1 can be 4. In formula (II) or (II-A), n2 can be 5.

In formula (II) or (II-A), $X_2$ can be H, $CH_3$, or $CH_2CH_3$. In formula (II) or (II-A), $X_2$ can be $F_T$. In formula (II) or (II-A), $X_1$ can be $F_T$. In formula (II) or (II-A), $X_3$ can be $F_T$. In formula (II) or (II-A), each $F_T$, when present, can be independently a polyfluoroorgano group. For example, each $F_T$, when present, can be independently $-(O)_q-[C(=O)]_r-(CH_2)_o(CF_2)_pCF_3$, in which
q is 0, and r is 1, or q is 1, and r is 0;
o is from 0 to 2; and
p is from 0 to 10;
provided that the compound does not contain —O—O—.

In formula (II) or (II-A), each $F_T$ can include $-(CF_2)_5CF_3$.

In a third aspect, the invention provides a compound of formula (III):

G-(A)$_m$-[B-A]$_n$-B-G　　(III)

in which
(i) A comprises polyurethane, polyurea, polyamide, polyalkylene oxide, polycarbonate, polyester, polylactone, polysilicone, polyethersulfone, polyalkylene, polyvinyl, polypeptide polysaccharide, or an ether-linked or amine-linked segments thereof (e.g., the segment in this case can refer to a repeating unit in the listed oligomer);
(ii) B is a bond, an oligomeric linker, or a linker with two terminal carbonyls; and
(iii) G is (a) a surface active group comprising a polyfluoroorgano group or (b) H;
(iv) n is an integer from 1 to 10; and
(v) m is 0 or 1;
provided that at least one G is the surface active group comprising a polyfluoroorgano group.

In some embodiments of formula (III), the compound has a structure of formula (IV):

G-(A)$_m$-[B-A]$_n$-B-G　　(IV)

in which
(i) A comprises a polysiloxane;
(ii) B comprises is a bond, an oligomeric linker, or a linker with two terminal carbonyls; and
(iii) G is (a) a surface active group comprising a polyfluoroorgano group or (b) H;
(iv) n is an integer from 1 to 10; and
(v) m is 0 or 1;
provided that at least one G is the surface active group comprising a polyfluoroorgano group.

In formula (III) or (IV), m can be 0.

In formula (III) or (IV), m can be 1. The surface-modifying macromolecule of formula (III) can be a compound of formula (III-A):

G-A-[B-A]$_n$-G　　(III-A).

In formula (III) or (IV), m can be 0. The surface-modifying macromolecule of formula (III) can be a compound of formula (III-B):

G-[B-A]$_n$-B-G　　(III-B).

In formula (III), (IV), (III-A), or (III-B), each B can be a linker with two terminal carbonyls.

In formula (III), (IV), (III-A), or (III-B), each B can be a bond. In formula (III), (IV), (III-A), or (III-B), the bond connecting G and B can be an oxycarbonyl bond (e.g., an oxycarbonyl bond in an ester). In formula (III), (IV), (III-A), or (III-B), n can be 1 or 2.

The surface-modifying macromolecule of formula (III) can be a compound of formula (III-C):

G-A-G　　(III-C).

In formula (III), (IV), (III-A), (III-B), or (III-C), A can be an oligomeric segment.

In formula (III), (III-A), (III-B), or (III-C), A can contain hydrogenated polybutadiene, hydrogenated polyisoprene, poly ((2,2-dimethyl)-1,3-propylene carbonate), polybutadiene, poly (diethylene glycol)adipate, poly (hexamethylene carbonate), poly (ethylene-co-butylene), (diethylene glycol-ortho phthalic anhydride) polyester, (1,6-hexanediol-ortho phthalic anhydride) polyester, (neopentyl glycol-ortho phthalic anhydride) polyester, a polysiloxane, bisphenol A ethoxylate, or poly(ethylene oxide)-b-poly(propylene oxide)-b-poly(ethylene oxide) (e.g., Pluronic®).

In formula (III), (III-A), (III-B), or (III-C), A can contain hydrogenated polybutadiene. In formula (III), (III-A), (III-B), or (III-C), A can contain hydrogenated polyisoprene.

In formula (III), (IV), (III-A), (III-B), or (III-C), A can contain a polysiloxane (e.g., A can contain a triblock copolymer PEG-b-(polysiloxane)-b-PEG).

In formula (III), (IV), (III-A), (III-B), or (III-C), each B can be a bond. Each B can be a linker with two terminal carbonyls. Each B can be norbornene-dicarbonyl or terephthaloyl.

In formula (III), (IV), (III-A), (III-B), or (III-C), both G can be the surface active group comprising a polyfluoroorgano group. Alternatively, in formula (III), (IV), (III-A), (III-B), or (III-C), one G can be the surface active group comprising a polyfluoroorgano group, and the other G can be H.

In formula (III), (IV), (III-A), (III-B), or (III-C), the surface active group can be a polyfluoroorgano (e.g., a polyfluoroalkyl). For example, the surface active group can be —(O)$_q$—[C(=O)]$_r$—(CH$_2$)$_o$(CF$_2$)$_p$CF$_3$, in which
q is 0, and r is 1, or q is 1, and r is 0;
o is from 0 to 2; and
p is from 0 to 10;
provided that the compound does not contain —O—O—.

The compound of any aspect can have a theoretical molecular weight of less than 10,000 Daltons. The compound of any aspect can have a thermal degradation temperature of from 200° C. to 400° C.

In a related aspect, the invention provides a composition containing one or more compounds of formula (III), (IV), (III-A), (III-B), or (III-C).

In a fourth aspect, the invention provides an admixture containing a base polymer and the compound of any one of the first aspect, second aspect, or third aspect (e.g., from 0.005% to 15% (w/w) of the compound of any one of the first aspect, second aspect, or third aspect).

The base polymer can be selected from the group consisting of polyurethanes, polysulfones, polycarbonates, polyesters, polyamides, polyimides, polyalkylenes (e.g., polyethylene, polypropylene, polystyrene, polybutadiene, polyisoprene, poly(acrylonitrile-butadienestyrene), polymethylmethacrylate, polyvinylacetate, polyacrylonitrile, or polyvinyl chloride), polysilicone, polysaccharides (e.g., cellulose, cellulose acetate, cellulose diacetate, or cellulose triacetate) and copolymers thereof (e.g., polyethylene terephtahate), and blends thereof.

The base polymer can be selected from the group consistin of polyethylene, polypropylene, polystyrene, polybutadiene, polyisoprene, poly(acrylonitrile-butadienestyrene), cellulose, cellulose acetates, cellulose diacetates, cellulose triacetates, polyethylene terephtahate.

The base polymer can be selected from the group consistin of polyamides, polyurethanes, polysilicones, polysulfones, polyalkylenes, polyesters, polypeptides, and polysaccharides.

The base polymer can be selected from the group consisting of polyurethanes, polysulfones, polycarbonates, polyesters, polyamides, polyethylene, polypropylene, polystyrene, polysilicone, poly(acrylonitrile-butadiene-styrene), polybutadiene, polyisoprene, polymethylmethacrylate, polyvinylacetate, polyacrylonitrile, polyvinyl cloride, polyethylene terephtahate, cellulose, cellulose acetates, and cellulose di- and tri-acetates.

Definitions

The term "alkyl," as used herein, refers to a branched or unbranched saturated hydrocarbon group, having from 1 to 10 carbon atoms (C$_{1-10}$). An alkyl may optionally include a monocyclic, bicyclic, or tricyclic ring system, in which each ring desirably has three to six members. The alkyl group may be unsubstituted or substituted with one, two, or three substituents independently selected from the group consisting of alkoxy, aryloxy, alkylthio, arylthio, halogen, disubstituted amino, and ester.

The term "alkylene," as used herein, refers to divalent alkyl groups.

The term "alkenyl," as used herein, refers to a branched or unbranched hydrocarbon group containing one, two, or three double bonds, desirably having from 2 to 10 carbon atoms (C$_{2-10}$). A C$_{2-10}$ alkenyl may optionally include non-aromatic monocyclic, bicyclic, or tricyclic rings, in which each ring desirably has five or six members. The C$_{2-10}$ alkenyl group may be unsubstituted or substituted with one, two, or three substituents independently selected from the group consisting of alkoxy, aryloxy, alkylthio, arylthio, halogen, disubstituted amino, and ester.

The term "alkynyl," as used herein, refers to a branched or unbranched hydrocarbon group containing one or more triple bonds, desirably having from 2 to 10 carbon atoms (C$_{2-10}$). The C$_{2-10}$ alkynyl group may be unsubstituted or substituted with one, two, or three substituents independently selected from the group consisting of alkoxy, aryloxy, alkylthio, arylthio, halogen, disubstituted amino, and ester.

The term "aryl," as used herein, represents a mono-, bicyclic, or multicyclic carbocyclic or heterocyclic ring system having one or two aromatic rings. Carbocyclic aryl groups may include from 6 to 10 carbon atoms. All atoms within an unsubstituted carbocyclic aryl group are carbon atoms. Non-limiting examples of carbocyclic aryl groups include phenyl, naphthyl, 1,2-dihydronaphthyl, 1,2,3,4-tetrahydronaphthyl, fluorenyl, indanyl, indenyl, etc. Heterocyclic aryl groups (e.g., heteroaryl groups) may include 1, 2, 3, or 4 heteroatoms selected from the group consisting of N, O, and S, provided that at least one aromatic ring includes at least one heteroatom. Heteroaryl groups may include from 1 to 9 carbon atoms. Non-limiting examples of heterocyclic aryl groups include benzimidazolyl, benzofuryl, benzothiazolyl, benzothienyl, benzoxazolyl, furyl, imidazolyl, indolyl, isoindazolyl, isoquinolinyl, isothiazolyl, isothiazolyl, isoxazolyl, oxadiazolyl, oxazolyl, purinyl, pyrrolyl, pyridinyl, pyrazinyl, pyrimidinyl, qunazolinyl, quinolinyl, thiadiazolyl (e.g., 1,3,4-thiadiazole), thiazolyl, thienyl, triazolyl, tetrazolyl, etc. The aryl group may be optionally substituted with one, two, three, four, or five substituents independently selected from the group consisting of: alkyl; alkenyl; alkynyl; alkoxy; alkylsulfonyl; aryloxy; halo; nitro; silyl; and cyano.

The term "base polymer," as used herein, refers to a polymer having a theoretical molecular weight of greater than or equal to 20 kDa (e.g., greater than or equal to 50 kDa, greater than or equal to 75 kDa, greater than or equal to 100 kDa, greater than or equal to 150 kDa, or greater than 200 kDa). Non-limiting examples of base polymers include polyurethanes, polysulfones, polycarbonates, polyesters, polyamides, polyimides, polyalkylenes (e.g., polyethylene, polypropylene, polystyrene, polybutadiene, polyisoprene, poly(acrylonitrile-butadienestyrene), polymethylmethacrylate, polyvinylacetate, polyacrylonitrile, polyvinyl chloride), polysilicone, polysaccharides (e.g., cellulose, cellulose acetate, cellulose diacetate, or cellulose triacetate) and copolymers thereof (e.g., polyethylene terephtahate).

The term "heteroalkyl," as used herein, refers to an alkyl, alkenyl, or alkynyl, which further includes 1, 2, 3, or 4 heteroatoms, each heteroatom independently selected from the group consisting of nitrogen, oxygen, and sulfur. Accordingly, heteroalkyl can be a C$_{1-10}$ heteroalkyl.

The term "linker with two terminal carbonyls," as used herein, refers to a divalent group having a molecular weight of between 56 Da and 1,000 Da, in which the first valency belongs to a first carbonyl, and a second valency belongs to a second carbonyl. Within this linker, the first carbonyl is bonded to a first carbon atom, and the second carbonyl is bonded to a second carbon atom. The linker with two terminal carbonyls can be non-polymeric (e.g., cycloalkylene-dicarbonyl (e.g., norbornene-dicarbonyl), benzenedicarbonyl, biphenyl-dicarbonyl, alkylene-dicarbonyl (e.g., succinoyl, glutaryl, adipoyl, pimeloyl, suberoyl, etc.)).

The term "molecular weight," as used herein, refers to a theoretical weight of an Avogadro number of molecules of identical composition. As preparation of a surface-modifying macromolecule can involve generation of a distribution of compounds, the term "molecular weight" refers to an idealized structure determined by the stoichiometry of the reactive ingredients. Thus, the term "molecular weight," as used herein, refers to a theoretical molecular weight.

The term "oligomeric linker," as used herein, refers to a divalent group containing from two to fifty bonded to each other identical chemical moieties. The chemical moiety can be an alkylene oxide (e.g., ethylene oxide).

The term "oligomeric segment," as used herein, refers to a length of a repeating unit or units that is less than about 200 monomeric units. Oligomeric segment can have a theoretical molecular weight of less than or equal to 10,000 Daltons, but preferably <7,000 Daltons and in some examples, <5,000 Daltons. The surface-modifying macromolecule of the invention can be formed from an oligomeric segment diol, triol, or tetraol to give a compound of formula (I), (II), (III), or (IV). Non-limiting examples of oligomeric segments include polyalkylene oxide (e.g., polyethylene oxide), hydrogenated polybutadiene, hydrogenated polyisoprene, poly ((2,2-dimethyl)-1,3-propylene carbonate), polybutadiene, poly (diethylene glycol)adipate, poly (hexamethylene carbonate), poly (ethylene-co-butylene), (diethylene glycol-ortho phthalic anhydride) polyester, (1,6-hexanediol-ortho phthalic anhydride) polyester, (neopentyl glycol-ortho phthalic anhydride) polyester, a polysiloxane, and bisphenol A ethoxylate.

The term "oxycarbonyl bond," as used herein, refers to a bond connecting an oxygen atom to a carbonyl group in an ester.

The term "polyalkylene," when used herein in reference to a base polymer, refers to a base polymer composed of linear or branched alkylene repeating units having from 2 to 4 carbon atoms and/or optionally a cyclic olefin of 3 to 10 carbon atoms (e.g., norbornene or tetracyclododecene). Each alkylene repeating unit is optionally substituted with one substituent selected from the group consisting of chloro, methoxycarbonyl, ethoxycarbonyl, hydroxy, acetoxy, cyano, and phenyl. Polyalkylene base polymer can be a co-polymer (e.g., MABS, MMBS, MBS, SB, SAN, SMMA, COC, or COP copolymer). Non-limiting examples of polyalkylene base polymers include polystyrene, a cyclic olefin polymer (COP), a cyclic olefin copolymer (COC), MABS, SAN, SMMA, MBS, SB, and polyacrylate (e.g., PMMA).

The term "polyethersulfone," as used herein is meant a polymer of the formula:

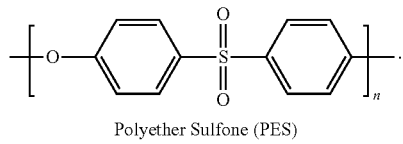

Polyether Sulfone (PES)

This polymer is commercially available under the trade name Radel™ from Amoco Corp.

The term "polyfluoroorgano group," as used herein, refers to a hydrocarbon group, in which from two to fifty nine hydrogen atoms were replaced with fluorine atoms. The polyfluoroorgano group contains one to thirty carbon atoms. The polyfluoroorgano group can contain linear alkyl, branched alkyl, or aryl groups, or any combination thereof. The polyfluoroorgano group can be a "polyfluoroacyl," in which the carbon atom through which the polyfluoroorgano group (e.g., polyfluoroalkyl) is attached to the rest of the molecule, is substituted with oxo. The alkyl chain within polyfluoroorgano group (e.g., polyfluoroalkyl) can be interrupted by up to nine oxygen atoms, provided that two closest oxygen atoms within polyfluoroorgano are separated by at least two carbon atoms. When the polyfluoroorgano consists of a linear or branched alkyl optionally substituted with oxo and/or optionally interrupted with oxygen atoms, as defined herein, such group can be called a polyfluoroalkyl group. Some polyfluoroorgano groups (e.g., polyfluoroalkyl) can have a theoretical molecular weight of from 100 Da to 1,500 Da. A polyfluoroalkyl can be $CF_3(CF_2)_r(CH_2CH_2)_p$—, where p is 0 or 1, r is from 2 to 20, or $CF_3(CF_2)_s(CH_2CH_2O)_x$—, where X is from 0 to 10, and s is from 1 to 20. Alternatively, polyfluoroalkyl can be $CH_mF_{(3-m)}(CF_2)_rCH_2CH_2$— or $CH_mF_{(3-m)}(CF_2)_s(CH_2CH_2O)_x$—, where m is 0, 1, 2, or 3; X is from 0 to 10; r is an integer from 2 to 20; and s is an integer from 1 to 20. In particular embodiments, X is 0. In other embodiments, polyfluoroalkyl is perfluoroheptanoyl. In certain embodiments, polyfluoroalkyl is formed from 1H,1H,2H,2H-perfluoro-1-decanol; 1H,1H,2H,2H-perfluoro-1-octanol; 1H,1H,5H-perfluoro-1-pentanol; or 1H,1H, perfluoro-1-butanol, and mixtures thereof. In still other embodiments, polyfluoroalkyl is $(CF_3)(CF_2)_5CH_2CH_2O$—, $(CF_3)(CF_2)_7CH_2CH_2O$—, $(CF_3)(CF_2)_5CH_2CH_2O$—, $CHF_2(CF_2)_3CH_2O$—, $(CF_3)(CF_2)_2CH_2O$—, or $(CF_3)(CF_2)_5$—. In still other embodiments the polyfluoroalkyl group contains $(CF_3)(CF_2)_5$—. In certain embodiments, polyfluoroorgano is —$(O)_q$—[C(=O)]_r—$(CH_2)_o(CF_2)_pCF_3$, in which q is 0, and r is 1, or q is 1, and r is 0; o is from 0 to 2; and p is from 0 to 10.

By "poly(oxy-1,4-phenylene sulfonyl-1,4-phenyleneoxy-1,4-phenyleneisopropylidene-1,4-phenylene)" is meant a polymer of the formula:

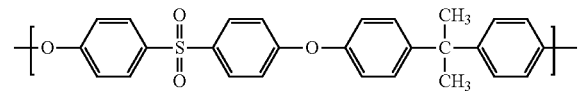

This polymer is commercially available under the trade name Udel™ P-3500 from Solvay Advanced Polymers.

As used herein, the term "polysulfone" refers to a class of polymers that include as a repeating subunit the moiety-aryl-$SO_2$-aryl. Polysulfones include, without limitation, polyethersulfones and poly(oxy-1,4-phenylene sulfonyl-1,4-phenyleneoxy-1,4-phenyleneisopropylidene-1,4-phenylene).

By "surface active group" is meant a lipophilic group covalently tethered to a surface-modifying macromolecule. The surface active group can be positioned to cap one, two, three, or four termini of the central polymeric portion of the surface-modifying macromolecule. Examples of surface active groups include, without limitation, polydimethylsiloxanes, hydrocarbons, polyfluoroorgano (e.g., polyfluoroalkyl and fluorinated polyethers), and combinations thereof.

The term "surface modifying macromolecule," as used herein, refers to the macromolecules described herein (e.g., a compound according to any one of formulas (I)-(IV), e.g., a compound of any one of compounds (1)-(9)).

The term "thermal degradation temperature," as used herein, refers to the lowest temperature at which there is an onset of weight loss of at least 5% (w/w) of the surface-modifying macromolecule during thermogravimetric analysis.

Other features and advantages of the invention will be apparent from the Drawings, Detailed Description, and the claims.

DETAILED DESCRIPTION

Figure 1A:
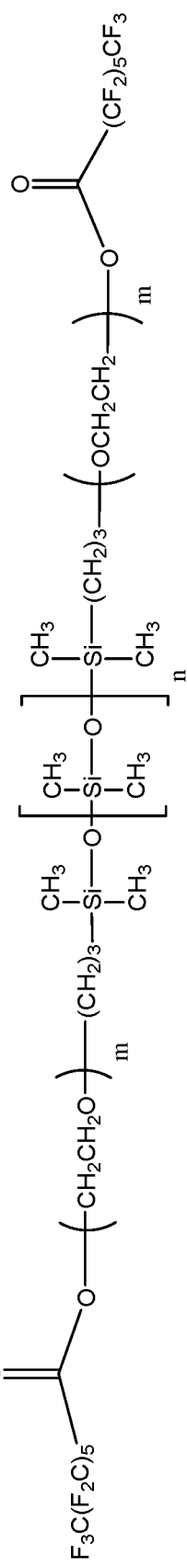
FIG. 1A shows the structure of compound (1).
Figure 1B:
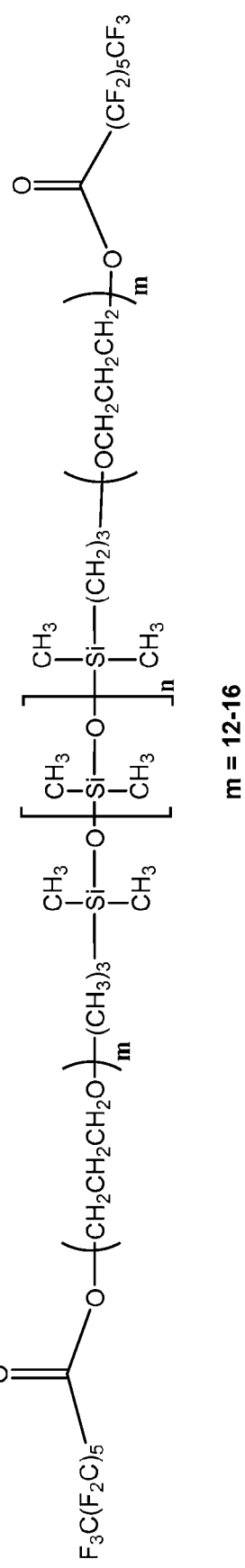
FIG. 1B shows the structure of compound (2).
Figure 2A:
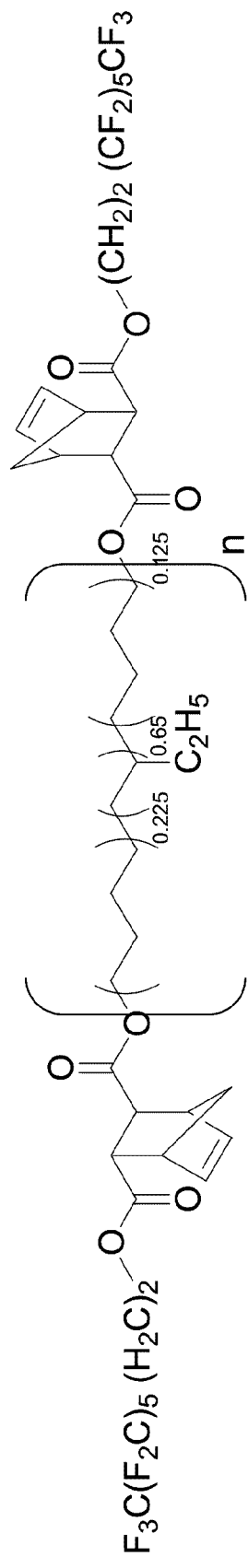
FIG. 2A shows the structure of compound (3).
Figure 2B:
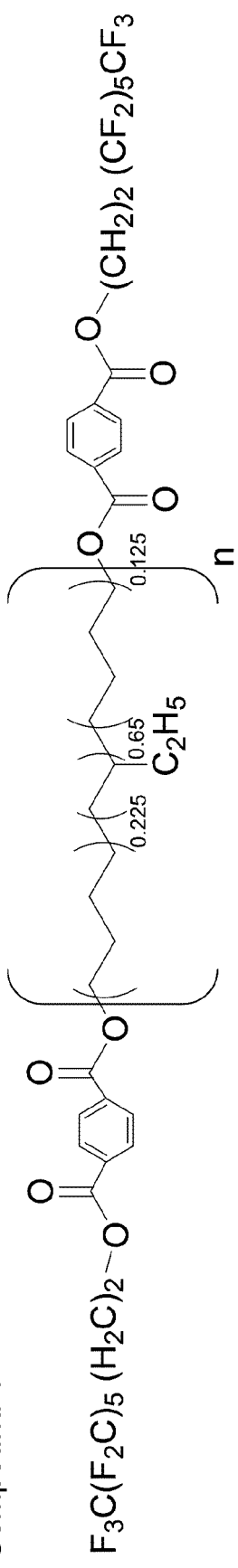
FIG. 2B shows the structure of compound (4).
Figure 3A:
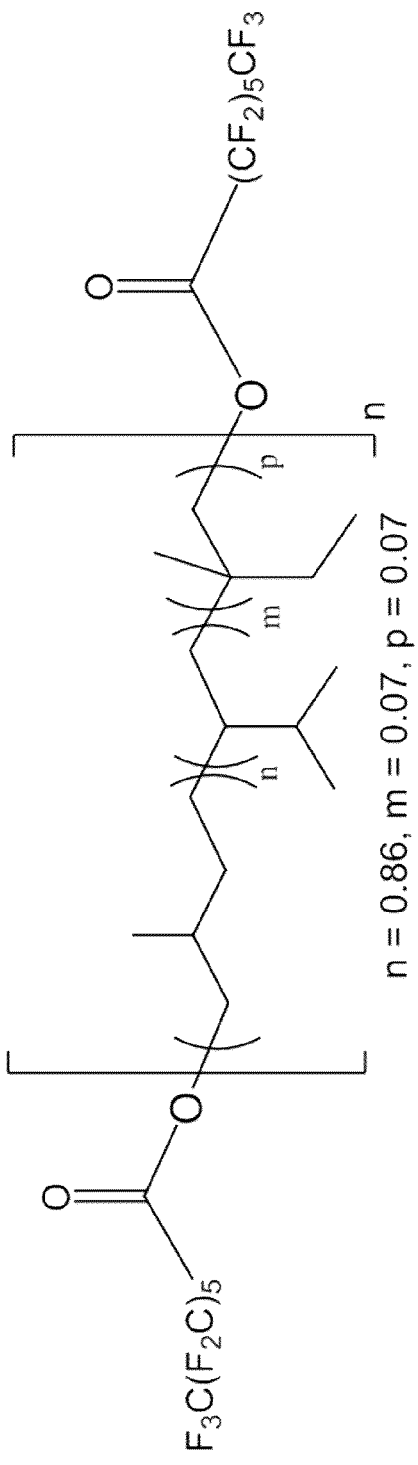
FIG. 3A shows the structure of compound (5).
Figure 3B:
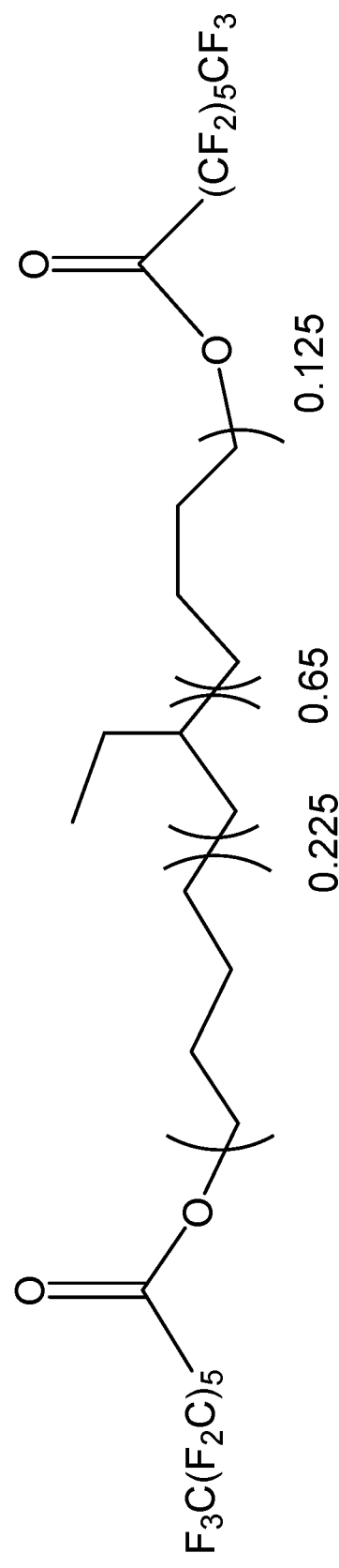
FIG. 3B shows the structure of compound (6).
Figure 4:
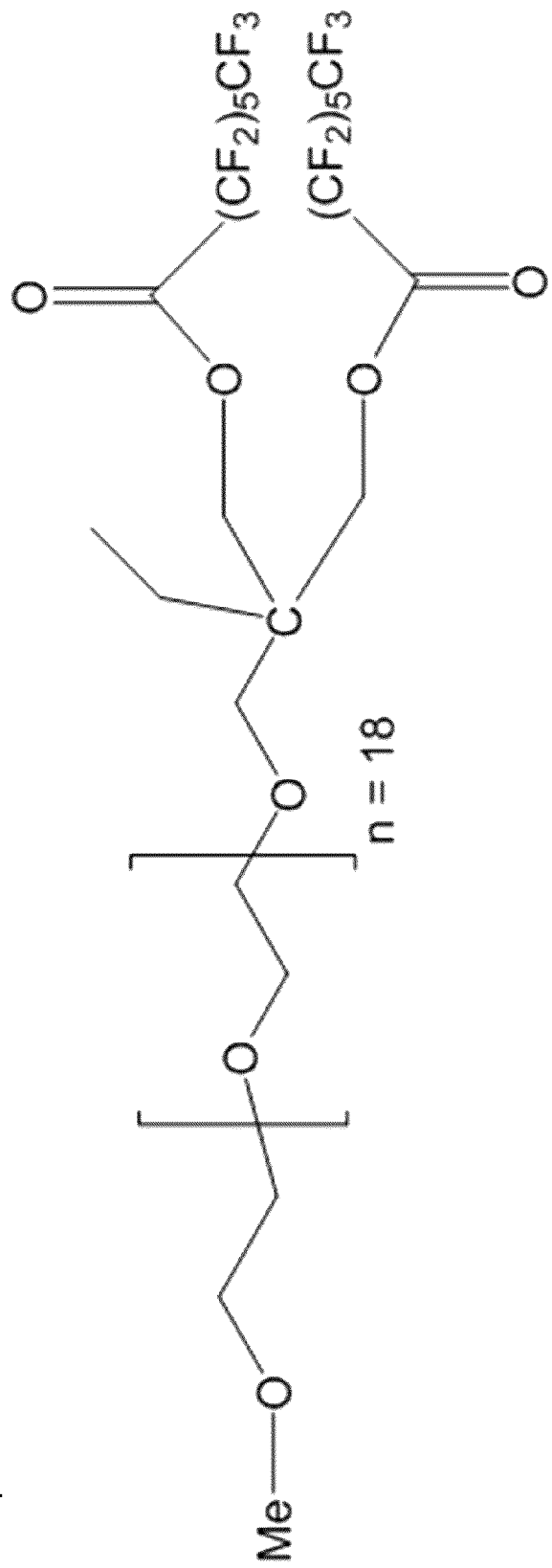
FIG. 4 shows the structure of compound (7).
Figure 5:
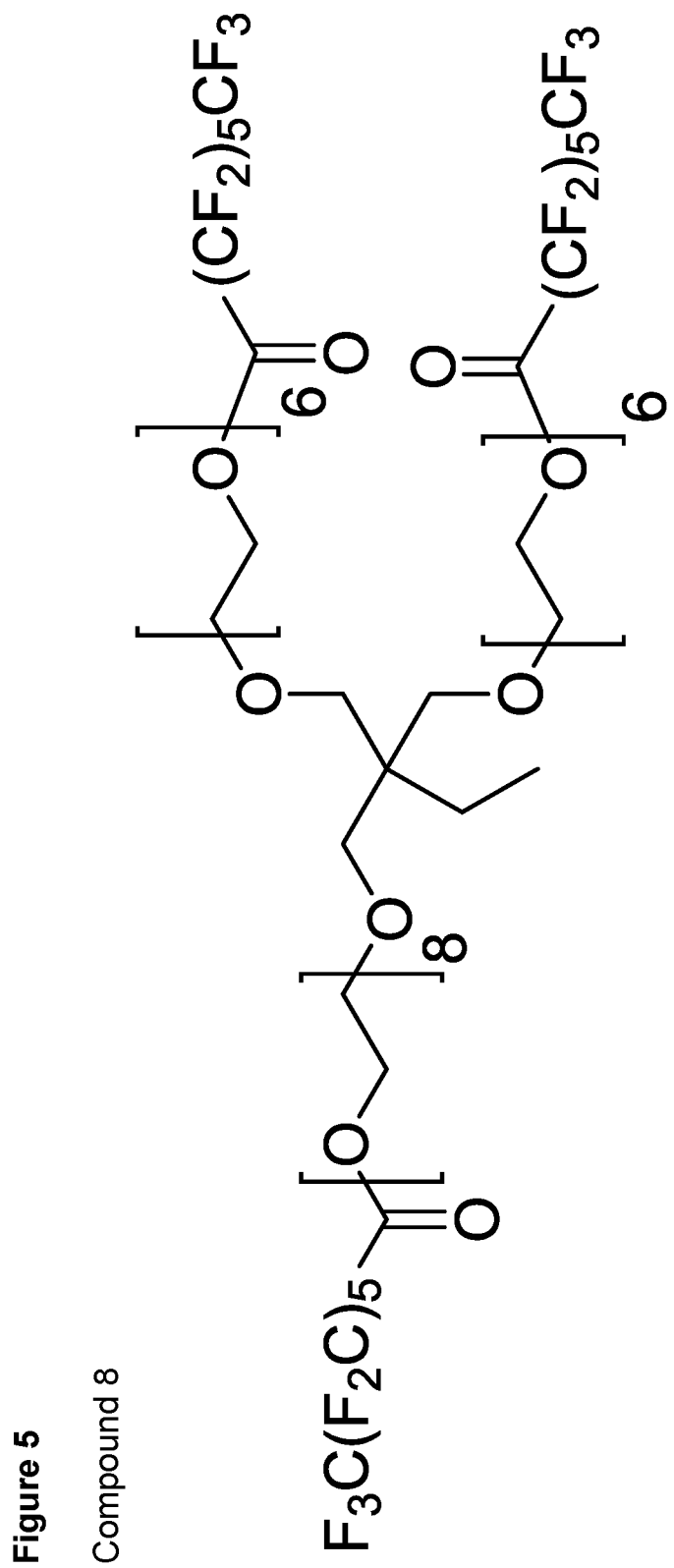
FIG. 5 shows the structure of compound (8).
Figure 6:
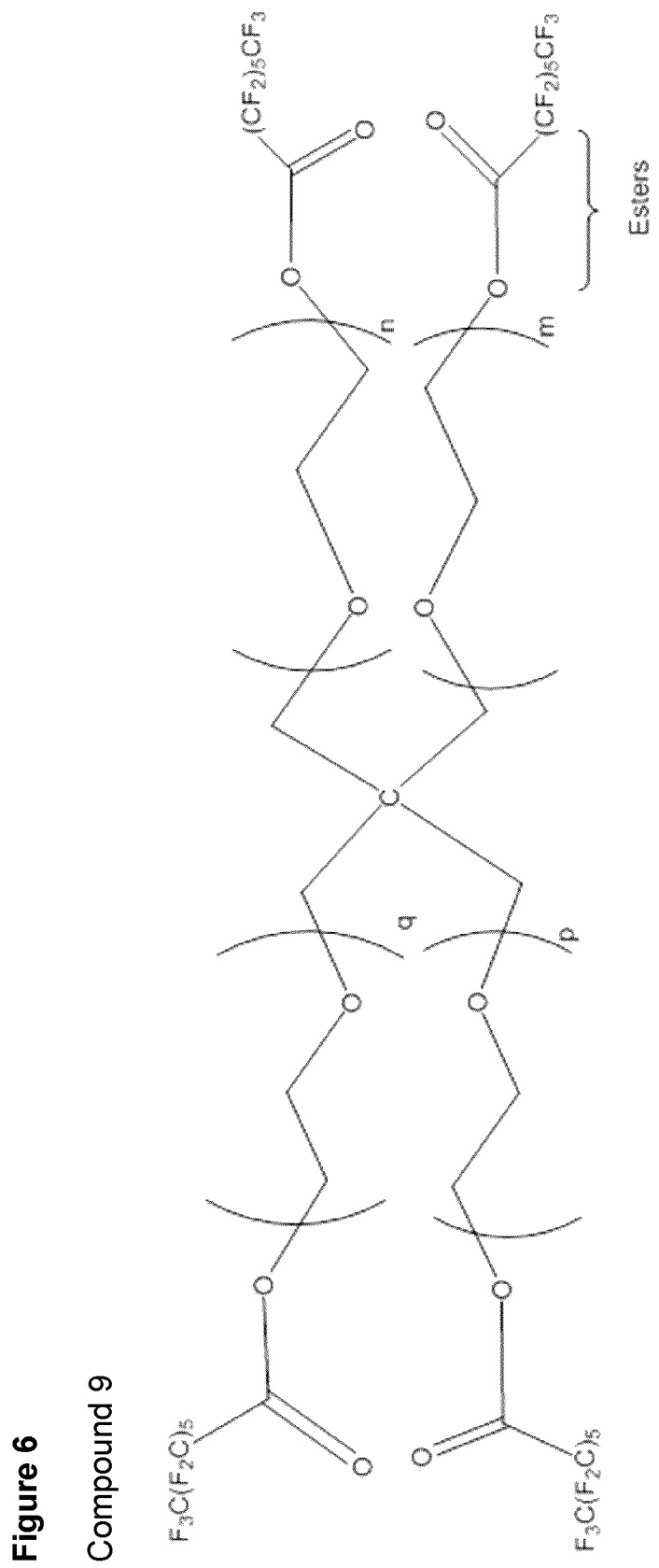
FIG. 6 shows the structure of compound (9).

In general, the present invention provides surface-modifying macromolecules, the structure of which is based on linking an oligomeric segment to a surface active group through a linker having at least one oxycarbonyl bond. The surface-modifying macromolecule of the invention can have a structure of any one of formulae (I)-(IV) described herein (e.g., the surface-modifying macromolecule of the invention can be any one of compounds (1)-(9)).

In particular, the invention provides admixtures of base polymers with surface modifying macromolecules and articles made therefrom. The articles of the invention can exhibit advantageous surface properties relative to the articles lacking a surface-modifying macromolecule. For example, the surface properties can be modified to render such a surface resistant to biofouling, immobilization of biomolecules, or mediation of biomolecule denaturation. In particular, the surfaces of the invention can be resistant to fouling (e.g., biofouling). The surface of the invention can also reduce degradation (e.g., through adsorption or denaturation) of a biological agent (e.g., a polypeptide (e.g., a monoclonal antibody or an antigen-binding fragment thereof), a polynucleotide (e.g., siRNA or an antisense compound), or a vaccine); the degradation can be due to interactions between the biological agent and a surface lacking a surface-modifying macromolecule. Without being bound by a theory, the inclusion of the surface-modifying macromolecule can decrease the surface wetting (with water), thereby reducing the contact between a biological agent (e.g., a protein, a nucleic acid, or bacteria) and the surface. The surface of the invention may be capable of sustaining a prolonged contact with a biologic without causing substantial denaturation or immobilization, e.g., the biologic can be abatacept, interferon β-1a, or insulin. In particular, these and other biologics may benefit from the surface properties of the invention, the surface properties reducing or preventing undesired interactions between the surface and the biologic (e.g., immobilization and/or denaturation of the biologic). Alternatively, the inclusion of the surface-modifying macromolecule can increase the surface wetting (with water). Such materials may be useful in applications requiring a hydrophilic surface.

The desired surface properties in the articles of the invention are believed to be provided by surface-modifying macromolecules of the invention that migrate during manufacturing to the surface of the article, thereby exposing the surface active groups at the surface of the article. The surface active groups are likely responsible, in part, for carrying the surface modifying macromolecule to the surface of the admixture, where the surface active groups are exposed on the surface. The migration of the surface modifying macromolecules to the surface is a dynamic process and is dependent on the surface environment. The process of migration is driven by the tendency towards establishing a low surface energy at the mixture's surface. When the balance between anchoring and surface migration is achieved, the surface-modifying macromolecule remains stable at the surface of the polymer, while simultaneously altering surface properties. Anchoring within the base polymer can be provided by the oligomeric segment.

Aggregation of multiple oligomeric molecules can increase their effective molecular radius, thereby lowering the permeability of the oligomeric molecules through a base polymer. Efficacy of the surface properties modification can be improved by the surface-modifying macromolecules of the invention. By excluding the combinations of hydrogen-bond donors and acceptors within the same molecule, the ability of the surface-modifying macromolecules of the invention to migrate to the surface of an article can be enhanced due to the likely reduction in aggregation. The surface-modifying macromolecules of the invention can exhibit enhanced ability to migrate to the surface of an article without compromising their anchoring in a base polymer. Thus, certain of the surface-modifying macromolecules of the invention do not contain hydrogen bond donors (e.g., O—H, N—H, or S—H moieties). In particular, the surface-modifying macromolecules may be free of urethane moieties.

The selection of the combination of a particular surface modifying macromolecule (SMM) and a particular base polymer can be determined by a number of factors. First, the type and amount of SMM to be added to base polymer is determined in part by whether the admixture forms a single stable phase, where the SMM is soluble in the base polymer (e.g., separation of the admixture to form two or more distinct phases would indicate an unstable solution). Then, the compatibility of the admixture can be tested by various known analytical methods. The surface of the admixture as a film or as a fiber can be analyzed by any useful spectroscopic method, such as X-ray photoelectron spectroscopy (XPS) with an elemental analysis (EA). Data from XPS could indicate the extent of modification of the surface by migrating SMMs and data from EA can indicate the extent of modification of the bulk material. Stable admixtures can then be tested to determine the antifouling properties of the surface under various conditions.

The surface modification can maintain transparency of the neat base polymer. Often the inclusion of admixtures in a base polymer can result in diminished optical properties (e.g., lower transparency), thereby limiting the utility of such materials in applications, where transparency of the material is desirable. In contrast, the articles of the invention including a surface-modifying macromolecule and a base polymer can have the transparency that is the same or slightly lower than that of the neat base polymer.

Articles of the invention can be prepared, at least in part, from a base polymer using a process requiring a high temperature processing (e.g., extrusion or molding). For example, COC and COP often require processing temperatures of greater than 200° C. (e.g., greater than or equal to 250° C. or greater than or equal to 300° C.). The surface-modifying macromolecules described herein can be thermally stable (e.g., can have a thermal degradation temperature of greater than or equal to 200° C. (e.g., greater than or equal to 250° C. or greater than or equal to 300° C.). Accordingly, articles of the invention can be formed from an admixture of a base polymer and a surface-modifying macromolecule at a temperature of greater than 200° C. (e.g., greater than or equal to 250° C. or greater than or equal to 300° C.). Articles of the invention can be manufactured (e.g., through high temperature processing, such as melt processing) from an admixture of a base polymer and a surface-modifying macromolecule. The surface-modifying macromolecule can be added prior to melt processing of the base polymer to produce an article of the invention. To form an admixture by melt processing, the surface-modifying macromolecule can be, for example, mixed with pelletized or powdered polymer and then melt processed by known methods such as, for example, molding or melt extrusion. The surface-modifying macromolecule can be mixed directly with the polymer in the melt condition or can first be pre-mixed with the polymer in the form of a concentrate of the surface-modifying macromolecule/polymer admixture in a brabender mixer. If desired, an organic solution of the surface-modifying macromolecule can be mixed with powdered or pelletized base polymer, followed by evaporation of the solvent and then by melt processing. Alternatively, the surface-modifying macromolecule can be injected into a molten polymer stream to form an admixture immediately prior to extrusion into the desired shape.

After melt processing, an annealing step can be carried out to enhance the development of advantageous properties described herein in the base polymer. In addition to, or in lieu of, an annealing step, the melt processed combination can also be embossed between two heated rolls, one or both of which can be patterned. An annealing step typically is conducted below the melt temperature of the polymer (e.g., at from about 50° C. to about 220° C.).

The surface-modifying macromolecule is added to a base polymer in amounts sufficient to achieve the desired surface properties for a particular application. Typically, the amount of surface-modifying macromolecule used is in the range of 0.05-15% (w/w) of the admixture. The amounts can be determined empirically and can be adjusted, as necessary or desired, to achieve the desired surface properties without compromising other physical properties of the base polymer.

Surface-Modifying Macromolecules

Surface-modifying macromolecules of the invention can be compounds of any one of formulae (I), (I-A), (II), (II-A), (III), (III-A), (III-B), (III-C), and (IV).

The surface-modifying macromolecule of the invention can be a compound of formula (I):

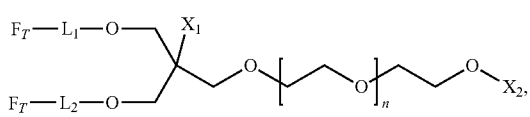

(I)

in which each $F_T$ is independently a surface active group selected from the group consisting of polydimethylsiloxanes, hydrocarbons, polyfluoroorgano, and combinations thereof;

$X_1$ is H, $CH_3$, or $CH_2CH_3$;

$X_2$ is H, $CH_3$, $CH_2CH_3$, or $F_T$;

each of $L_1$ and $L_2$ is independently a bond, an oligomeric linker, or a linker with two terminal carbonyls; and n is an integer from 5 to 50.

In particular, a compound of formula (I) can be a compound of formula (I-A):

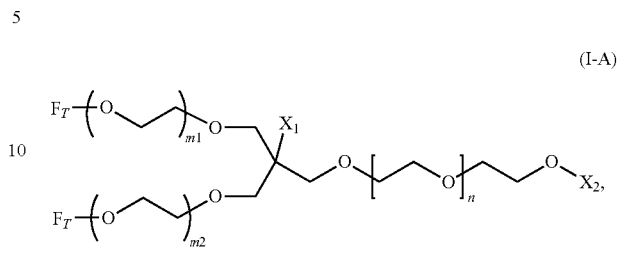

(I-A)

in which each of m1 and m2 is independently an integer from 0 to 50 (e.g., each of m1 and m2 is independently an integer from 1 to 50).

The surface-modifying macromolecule of the invention can be a compound of formula (II):

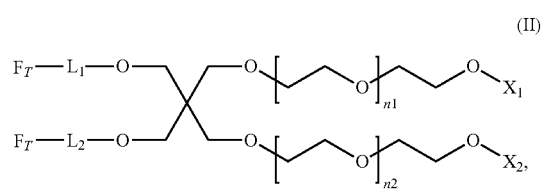

(II)

in which each $F_T$ is independently a surface active group selected from the group consisting of polydimethylsiloxanes, hydrocarbons, polyfluoroorgano, and combinations thereof;

each of $X_1$ and $X_2$ is independently H, $CH_3$, $CH_2CH_3$, or $F_T$;

each of $L_1$ and $L_2$ is independently a bond, an oligomeric linker, or a linker with two terminal carbonyls; and each of n1 and n2 is independently an integer from 3 to 50.

In particular, the compound of formula (II) can be a compound of formula (II-A):

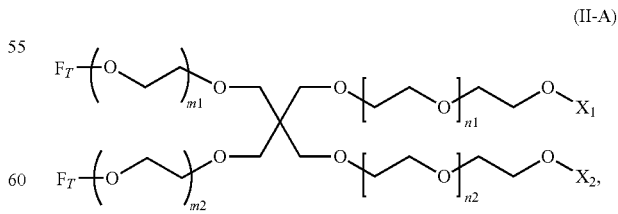

(II-A)

in which each of m1 and m2 is independently an integer from 0 to 50 (e.g., each of m1 and m2 is independently an integer from 1 to 50).

The surface-modifying macromolecule of the invention can be a compound of formula (III):

G-(A)$_m$-[B-A]$_n$-B-G     (III)

in which
(i) A comprises polyurethane, polyurea, polyamide, polyalkylene oxide, polycarbonate, polyester, polylactone, polysilicone, polyethersulfone, polyalkylene, polyvinyl, polypeptide polysaccharide, or an ether-linked or amine-linked segments thereof (e.g., the segment in this case can refer to a repeating unit in the listed oligomer);
(ii) B is a bond, an oligomeric linker, or a linker with two terminal carbonyls; and
(iii) G is (a) a surface active group comprising a polyfluoroorgano group or (b) H;
(iv) n is an integer from 1 to 10; and
(v) m is 0 or 1;
provided that at least one G is the surface active group comprising a polyfluoroorgano group.

Oligomeric Segments

The surface-modifying macromolecules of the invention can be prepared from an oligomeric segment diol, triol, or tetraol. Because the reactions are moisture sensitive, they are typically carried out under an inert N$_2$ atmosphere and under anhydrous conditions. The resulting surface-modifying macromolecules can be isolated and purified as appropriate. Surface modifying macromolecules of formula (I) or (II) can be prepared, for example, from commercially available mono-dihydroxysubstituted-alkyl or alkyloxyalkyl-terminated PEGs (e.g., Ymer™ N120, a difunctional polyethylene glycol monomethyl ether, from Perstorp). Exemplary oligomeric segment diols, triols, and tetraols are shown below.

Scheme 1 shows a non-limiting example of a structure of an oligomeric segment triol that can be used to prepare a surface-modifying macromolecule of formula (I) or (I-A).

Scheme 1

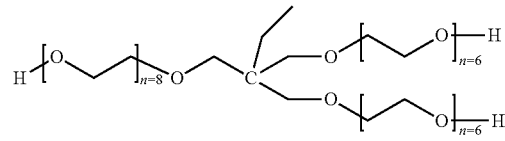

Polyol 3165 (Perstorp)
TrimethyolPropane Ethoxylate
MW = 1000

$$\frac{\text{EO Units}}{\text{OH Units}} = \frac{20}{3}$$

Scheme 2 shows certain oligomeric segment tetraols that can be used in the preparation of compounds according to formula (II) or (II-A).

Scheme 2

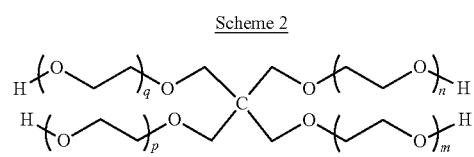

q + p + n + m = 5, 10, 15
Pentaerythritol Ethoxylate
When q + p + n + m = 15
MW = 796.47

Scheme 3 shows some of the oligomeric segment diols that can be used in the preparation of compounds of formulas (III), (III-A), (III-B), (III-C), or (IV):

Scheme 3

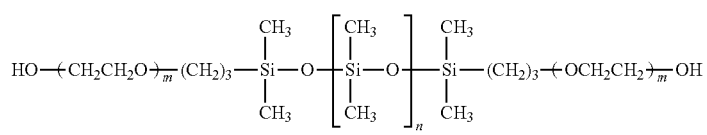

C15 Siloxane Diol
MW = 1000
Hydroxyl terminated polydimethylsiloxanes
(EtO-PDMS-OEt) block copolymer (m = 1)

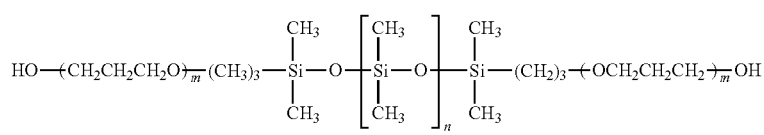

C22 Siloxane Diol
MW = 2500-3000
Hydroxyl terminated polydimethylsiloxanes
(PrO-PDMS-OPr) block copolymer (m = 12-16)

-continued

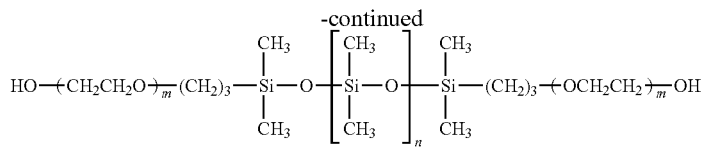

C25 Siloxane Diol
MW = 3500
Hydroxyl terminated polydimethylsiloxanes
(EtO-PDMS-OEt) block copolymer (m = 25)

Diols known in the art can be used to prepare the compound of formula (Ill), (III-A), (III-B), (III-C), or (IV). For example, the diol of an oligomeric segment can be selected from the group consisting of polyurethane, polyurea, polyamide, polyalkylene oxide, polycarbonate, polyester, polylactone, polysilicone, polyethersulfone, polyalkylene, polyvinyl, polypeptide polysaccharide, or an ether-linked or amine-linked segments thereof (e.g., the segment in this case can refer to a repeating unit in the listed oligomer).

Linkers

The compounds described herein (e.g., compounds according to any one of formulas (I)-(IV), e.g., compounds 1-7) can include linkers. The linker component of the invention is, at its simplest, a bond between the alkoxy moiety and the surface active group segment (e.g., a polyfluoroorgano). Alternatively, the linker can be a linker having two terminal carbonyl groups. The linker having two terminal carbonyl groups can include a linear, cyclic, or branched molecular skeleton, optionally having pendant groups. Yet another linker that can be used in the compounds of the invention is an oligomeric linker. Oligomeric linkers can contain from two to fifty bonded to each other identical chemical moieties. The chemical moiety in an oligomeric linker of the invention can be an alkylene oxide (e.g., —$CH_2CH_2O$—). Thus, the linker can be a bond, an oligomeric linker, or a linker having two terminal carbonyl groups.

The linking of an oligomeric segment diol, triol, or tetraol to a surface active group segment (e.g., a polyfluoroorgano) can be achieved through a covalent bond forming reaction between the reactive groups present in the precursors of each segment (e.g., an oligomeric segment, a linker, or a surface active group). Examples of chemically reactive functional groups which may be employed for this purpose include hydroxyl and acyl halide. Thus, in a surface-modifying macromolecule of the invention, a surface active group segment (e.g., a polyfluoroorgano) can be linked to an oligomeric segment through one or more oxycarbonyl bonds.

Spacer elements in the linker typically consist of linear or branched chains and may include a $C_{1-10}$ alkyl, a heteroalkyl of 1 to 10 atoms, a $C_{2-10}$ alkenyl, a $C_{2-10}$ alkynyl, aryl of 5 to 10 atoms, or —$(CH_2CH_2O)_nCH_2CH_2$—, in which n is from 1 to 4.

Non-limiting examples of theoretical molecular weights that the linkers of the invention can have include from 100 Da to 2000 Da (e.g., from 100 Da to 1500 Da, from 100 Da to 1000 Da, from 200 Da to 2000 Da, from 200 Da to 1500 Da, from 200 Da to 1000 Da, from 300 Da to 2000 Da, from 300 Da to 1500 Da, or from 300 Da to 1000 Da).

Medical Articles

The admixtures of the invention can be used to prepare medical articles, e.g., implantable medical articles. Certain medical articles of the invention may require high temperature processing often exceeding 200° C. in the form of extruded or molded articles, where processing temperatures can reach a range of 250-300° C. The admixtures of the invention can have the required high temperature stability during the processing. The admixtures therefore can provide the required resistance to degradation at high temperatures while providing the desired biocompatible properties, such as resistance to biofouling, resistance to immobilization of biomolecules on the surface, and resistance to mediation of biomolecule denaturation. The technology can involve the incorporation of the SMMs into the base polymers which then bloom to the surface, thus modifying the surface of the polymers but keeping the bulk properties intact. The base polymers now have a fluorinated surface with a high degree of hydrophobicity. Articles that may be formed from the admixtures of the invention include implanted medical devices which can be percutaneous or cutaneous.

EXAMPLES

Abbreviations

YMer (Diol)=Hydroxy Terminated Polyethylene glycol monomethyl ether

YMerOH(Triol)=Trimethylolpropane Ethoxylate

XMer (Tetraol)=Pentaerythritol Ethoxylate

C25 (Diol)=Hydroxy Terminated Polidimethylsiloxane (Ethylene Oxide-PDMS-Ethylene Oxide) block Copolymer Preparation of Surface-Modifying Macromolecules General Synthesis Description for Ester-based Surface-Modifying Macromolecules A diol such as Ymer diol, hydroxyl terminated polydimethylsiloxane, or polyols such as trimethylolpropane ethoxylate or pentaerythritol ethoxylate are reacted in a one-step reaction with a surface active group precursor (e.g., perfluoroheptanoyl chloride) at 40° C. in a chlorinated organic solvent e.g. chloroform or methylene chloride in the presence of an acid scavenger like pyridine or triethylamine for 24 h. This reaction end-caps the hydroxyl groups with polyfluoroorgano groups. Because the reactions are moisture sensitive, the reactions are carried out under a nitrogen atmosphere using anhydrous solvents. After the reaction the solvent is rotary evaporated and the product is dissolved in Tetrahydrofuran (THF) which dissolves the product and precipitates the pyridine salts which are filtered off and the filtrate rotary evaporated further to dryness. The product is then purified by dissolving in minimum THF and precipitating in hexanes. This is performed 3 times and after which the final product is again rotary evaporated and finally dried in a vacuum oven at 60° C. overnight.

Synthesis of Compound 1

Glassware used for the synthesis was dried in an oven at 110° C. overnight. To a 2-necked 1000 mL oven dried round bottom flask equipped with a stir bar was added 85 g (24 mmol) of C25-Diol (MW=3500). The flask with the diol was degassed overnight at 60° C. with gentle stirring and then purged with dry $N_2$ the following day. The heating was turned off. A 1000 mL graduated cylinder was charged with 320 mL anhydrous $CHCl_3$, sealed by a rubber septa and purged with dry $N_2$. The $CHCl_3$ was transferred to the 2-necked flask via a cannula and the diol stirred vigorously to dissolve in the solvent. Anhydrous pyridine (11.53 g, 146 mmol) was added to the C25-Diol solution using a plastic syringe, and the resulting mixture was stirred to dissolve all materials. Another oven dried 2-necked 1000 mL flask was charged with 32.51 g (85 mmol) of perfluoroheptanoyl chloride. The flask was sealed with rubber septa and degassed for 5 minutes, then purge with nitrogen. At this time 235 mL of anhydrous $CHCl_3$ were added via cannula to the 1000 mL 2-necked flask containing the perfluoroheptanoyl chloride. Stir at room temperature to dissolve the acid chloride. This flask was fitted with an addition funnel and the C25-Diol-pyridine solution in $CHCl_3$ was transferred via a cannula into the addition funnel. $N_2$ flow through the reactor was adjusted to a slow and steady rate. Continuous drop-wise addition of C25-Diol-pyridine solution to the acid chloride solution was started at room temperature and was continued over a period of ~4 hours. Stirring was maintained at a sufficient speed to achieve good mixing of reagents. After completing addition of the C25-Diol-pyridine solution, the addition funnel was replaced with an air condenser, and the 2-neck flask was immerses in an oil bath placed on a heater fitted with a thermocouple unit. The temperature was raised to 40° C., and the reaction continued at this temperature under $N_2$ for 24 h.

The product was purified by evaporating $CHCl_3$ in a rotary evaporator and by filtering the pyridine salts after addition of THF. The crude product was then precipitated in isopropanol/hexanes mixture twice. The oil from the IPA/Hexane that precipitated was subjected to further washing with hot hexanes as follows. About 500 mL of Hexanes was added to the oil in a 1 L beaker with a stir bar. The mixture was stirred while the Hexanes was heated to boiling. The heating was turned off, and the mixture was allowed to cool for 5 minutes. The oil settles at the bottom at which point the Hexane top layer is decanted. The isolated oil is further dissolved in THF, transferred to a round bottom flask and then the solvents rotary evaporated. The oil is finally dried in a vacuum oven at 40° C. for 24 h. The purified product (a mixture of di- and mono-substituted products) was characterized by GPC (Molecular Weight based on Polystyrene Standards), elemental analysis for fluorine, $^{19}F$ NMR, $^1H$ NMR, FTIR and TGA. Appearance: viscous oil. Weight Average molecular weight (polystyrene equivalent)=5791 g/mol. Polydispersity: 2.85. Elemental analysis: F: 7.15% (theory: 10.53%). $^{19}F$ NMR (CDCl$_3$, 400 MHz): δ ppm −80.78 (m, $CF_3$), −118.43 (m, $CF_2$), −121.85 (m, $CF_2$), −122.62 (m, $CF_2$), −126.14 (m, $CF_2$). $^1H$ NMR (CDCl$_3$, 400 MHz): δ ppm=0.0 (m, $CH_3Si$), 0.3 (br m, $CH_2Si$), 1.4 (br m, $CH_2$), 3.30 (m, $CH_2$'s), 4.30 (m, $CH_2COO$—). FTIR, neat (cm$^{-1}$): 3392 (OH), 2868 ($CH_2$), 1781 (O—C=O, ester), 1241, 1212, 1141, 1087 ($CF_3$, $CF_2$,). Thermal decomposition temperature (TGA), $N_2$, at ca. 10% (w/w) loss=204° C.

Synthesis of Compound 2

Glassware used for the synthesis was dried in an oven at 110° C. overnight.

To a 2-necked 100 mL oven dried round bottom flask equipped with a stir bar was added 10 g (5 mmol) of PDMS C22—Diol (C22 diol, MW=3000). The flask with the diol was degassed overnight at 60° C. with gentle stirring and then purged with dry $N_2$ the following day. Heating was turned off. A 100 mL graduated cylinder was filled with 50 mL anhydrous $CHCl_3$, sealed with a rubber septum, and purged with dry $N_2$. The $CHCl_3$ was transferred to the 2-necked flask via a cannula, and the diol was stirred vigorously to dissolve in the solvent. Anhydrous pyridine (0.53 g, 7 mmol) was then added to the C22-Diol solution using a plastic syringe, and the resulting mixture was stirred to dissolve all materials. Another oven-dried 2-necked 250 mL flask was charged with 3.19 g (8 mmol) perfluoroheptanoyl chloride. The flask was then sealed with a rubber septum, and the mixture in the flask was degassed for 5 minutes and purged with nitrogen. Then, 22 mL of anhydrous $CHCl_3$ were added using a graduated cylinder and a cannula to transfer the solvent to the 250 mL 2-necked flask containing the perfluoroheptanoyl chloride. The resulting mixture was stirred at room temperature to dissolve the acid chloride. The flask was then equipped with an addition funnel, and the C22 diol/pyridine solution in $CHCl_3$ was transferred to the addition funnel using a cannula. $N_2$ flow through the reactor was adjusted to a slow and steady rate. C22 diol/pyridine solution was then added continuously drop-wise to the acid chloride solution at room temperature over a period of ~4 hours. Stirring was maintained at a sufficient speed to achieve good mixing of reagents. After completing the addition of the C22 diol, the addition funnel was replaced with an air condenser, and the 2-necked flask was immersed in an oil bath placed on a heater fitted with a thermocouple unit. The temperature was raised to 50° C., and the reaction mixture was left at this temperature under $N_2$ for 24 h.

Then, heating and stirring were turned off. The flask was removed and its contents were poured into a round bottom flask. Volatiles were removed by rotary evaporation. Upon concentration, a dense precipitate (pyridine salts) formed. THF was added to dissolve the product, and the precipitated pyridine salts were removed by filtration using a coarse Whatman Filter paper (No 4), as the pyridine salts are insoluble in THF. Volatiles were removed by rotary evaporation. The crude product was then dissolved in 100 mL of $CHCl_3$ and poured into a separatory funnel. 150 mL of water and 5 mL of 5N HCl were added to neutralize any remaining pyridine. The funnel was shaken, and the product was extracted into $CHCl_3$. The bottom $CHCl_3$ layer containing product was then washed in a separatory funnel sequentially with water, 5 mL of 5% (w/v) $NaHCO_3$ solution to neutralize any remaining HCl, and with distilled water. The $CHCl_3$ layer was separated and concentrated by rotary evaporation to obtain crude product, which was then dissolved in 10 ml of isopropanol. The resulting solution was added dropwise to a 1 L beaker containing 200 mL of DI Water with 1% (v/v) MeOH with continuous stirring. The product separated out as oil, at which time the solution was kept in an ice bath for 20 minutes, and the top aqueous layer was decanted. The oil was dissolved in THF and transferred into a 200 mL round bottom flask. The volatiles were removed by rotary evaporation at a maximum of 80° C. and 4 mbar to remove residual solvents. The resulting product was dried in a vacuum oven at 60° C. for 24 h to give a purified product as a light yellow, clear oil (~64% yield). The purified product was characterized by GPC (Molecular Weight based on Polystyrene Standards), and elemental analysis (for fluorine). Appearance: Light Yellow clear oil. Weight Average Molecular Weight (Polystyrene equivalent) Mw=5589, Polydispersity PD=1.15. Elemental Analysis F: 12.86% (theory: 13.12%)

Synthesis of Compound 3

Glassware used for the synthesis was dried in an oven at 110° C. overnight. To a 2-necked 250 mL oven dried round bottom flask equipped with a stir bar was added 20 g (8.0 mmol) of hydrogenated-hydroxyl terminated polybutadiene (HLBH diol, MW=2000). The flask with the diol was degassed overnight at 60° C. with gentle stirring and then purged with dry $N_2$ the following day. At this time, the heating was turned off. A 200 mL graduated cylinder was charged with 104 mL anhydrous $CHCl_3$, sealed by a rubber septa, and purged with dry $N_2$. The $CHCl_3$ was transferred to the 2-necked flask via a cannula, and the diol was stirred vigorously to dissolve in the solvent. At this time, anhydrous pyridine (3.82 g, 48 mmol) was added to the HLBH diol solution using a plastic syringe, and the resulting mixture was stirred to dissolve all materials. Another oven dried 2-necked 100 mL flask was charged with trans-5-norbornene-2,3-dicarbonyl chloride ("NCl"; 3.70 g, 17 mmol), sealed with rubber septa, and degassed for 5 minutes, and then purged with nitrogen. At this time, 52 mL of anhydrous $CHCl_3$ were added using a graduated cylinder and a cannula to transfer the solvent to the 100 mL 2-necked flask containing NCl. The resulting mixture was stirred to dissolve NCl. The 250 mL 2-necked flask was then fitted with an addition funnel, and the solution of NCl in $CHCl_3$ was transferred to the addition funnel using a cannula. $N_2$ flow was adjusted through the reactor to a slow and steady rate. The solution of NCl was added continuously drop-wise to the HLBH-pyridine solution at room temperature over a period of ~1 hour to form a pre-polymer. Stirring was maintained at a sufficient speed to achieve good mixing of reagents.

In parallel, another oven-dried 50 mL flask was charged with Capstone™ AI-62 perfluorinated reagent (5.45 g, 15 mmol). The flask was sealed with rubber septa, degassed for 15 minutes, and purged with $N_2$. Anhydrous $CHCl_3$ (17 mL) and anhydrous pyridine (1.9 g, 24 mmol) were added. The mixture was stirred to dissolve all reagents. After the addition of the NCl solution to the 250 mL 2-necked flask was complete, the Capstone™ AI-62 perfluorinated reagent solution was added to this flask using a cannula with stirring. The addition funnel was replaced with an air condenser, and the 250-mL 2-necked flask was immersed in an oil bath placed on a heater fitted with a thermocouple unit. The temperature was raised to 50° C., and the reaction continued at this temperature under $N_2$ for 24 h.

After the reaction, heating and stirring were turned off. The reaction flask was removed, and its contents were poured into a round bottom flask. $CHCl_3$ was removed by rotary evaporation. Upon concentration, a dense precipitate (pyridine salts) formed. THF was added to dissolve the product, and the precipitated pyridine salts were removed by filtration using a coarse Whatman Filter paper (No 4). Pyridine salts are insoluble in THF. THF was removed by rotary evaporation. The crude product was dissolved in 100 mL of $CHCl_3$ and was poured into a separatory funnel. 100 mL of water were added, followed by the addition of 5 mL of (5N) HCl to neutralize any remaining pyridine. The funnel was shaken, and the product was extracted into $CHCl_3$. The bottom $CHCl_3$ layer containing product was isolated and washed in a separatory funnel with water (5 mL of 5% $NaHCO_3$ solution were added to neutralize any remaining HCl). The organic layer was then washed once more with plain distilled water. Isolated $CHCl_3$ layer was concentrated by rotary evaporation to obtain crude product. The crude product was dissolved in 10 mL of isopropanol (IPA) and was then added dropwise to a beaker containing 200 mL of deionized water containing 1% (v/v) MeOH with continuous stirring. Product separated out as an oil. The mixture was kept in ice bath for 20 minutes, and the top water layer was decanted. The oil was dissolved in THF and transferred into 200 mL round bottom flask. THF was removed by rotary evaporation at a maximum temperature of 80° C. and 4 mbar to remove all residual solvents. The resulting product was dried in a vacuum oven at 60° C. for 24 h to give a purified product as a viscous oil (~55% yield). The purified product (a mixture of di- and mono-substituted products) was characterized by GPC, elemental analysis, for fluorine, and Hi-Res TGA. Appearance: light yellow viscous liquid. Weight Average molecular weight (polystyrene equivalent)=12389 g/mol. Polydispersity, PD: 1.43. Elemental analysis: F: 10.6% (theory: 14.08%). Thermal decomposition temperature (TGA), $N_2$, at 10% (w/w) loss: 363° C.

Synthesis of Compound 4

Compound 4 was prepared according to a procedure similar to compound 3.

Glassware used for the synthesis was dried in an oven at 110° C. overnight. To a 2-necked 250 mL oven dried round bottom flask equipped with a stir bar was added 15 g (6.0 mmol) of hydrogenated-hydroxyl terminated polybutadiene (HLBH diol, MW=2000). The flask with the diol was degassed overnight at 60° C. with gentle stirring and then purged with dry $N_2$ the following day. At this time, the heating was turned off. A 100 mL graduated cylinder was charged with 12 mL anhydrous $CHCl_3$, sealed by a rubber septa, and purged with dry $N_2$. The $CHCl_3$ was transferred to the 2-necked flask via a cannula, and the diol was stirred vigorously to dissolve in the solvent. At this time, anhydrous pyridine (0.95 g, 12 mmol) was added to the HLBH diol solution using a plastic syringe, and the resulting mixture was stirred to dissolve all materials. Another oven dried 2-necked 100 mL flask was charged with terephthaloyl chloride (2.57 g, 13 mmol), sealed with rubber septa, and degassed for 5 minutes, and then purged with nitrogen. At this time, 85 mL of anhydrous $CHCl_3$ were added using a graduated cylinder and a cannula to transfer the solvent to the 100 mL 2-necked flask. The resulting mixture was stirred to dissolve terephthaloyl chloride. The 250 mL 2-necked flask was then fitted with an addition funnel, and the solution of terephthaloyl chloride in $CHCl_3$ was transferred to the addition funnel using a cannula. $N_2$ flow was adjusted through the reactor to a slow and steady rate. The solution of terephthaloyl chloride was added continuously drop-wise to the HLBH-pyridine solution at room temperature over a period of ~1 hour to form a pre-polymer. Stirring was maintained at a sufficient speed to achieve good mixing of reagents.

In parallel, another oven-dried 50 mL flask was charged with Capstone™ AI-62 perfluorinated reagent (5.45 g, 15 mmol). The flask was sealed with rubber septa, degassed for 15 minutes, and purged with $N_2$. Anhydrous $CHCl_3$ (12 mL) and anhydrous pyridine (0.95 g, 12 mmol) were added. The mixture was stirred to dissolve all reagents. After the addition of the terephthaloyl chloride solution to the 250 mL 2-necked flask was complete, the Capstone™ AI-62 perfluorinated reagent solution was added to this flask with stirring. The addition funnel was replaced with an air condenser, and the 250-mL 2-necked flask was immersed in an oil bath placed on a heater fitted with a thermocouple unit. The temperature was raised to 50° C., and the reaction continued at this temperature under $N_2$ for 24 h.

After the reaction, heating and stirring were turned off. The reaction flask was removed, and its contents were poured into a round bottom flask. $CHCl_3$ was removed by rotary evaporation. Upon concentration, a dense precipitate (pyridine salts) formed. THF was added to dissolve the product, and the precipitated pyridine salts were removed by filtration using a coarse Whatman Filter paper (No 4). Pyridine salts are insoluble in THF. THF was removed by rotary evaporation. The crude product was dissolved in 100 mL of $CHCl_3$ and was poured into a separatory funnel. 100 mL of water were added, followed by the addition of 5 mL of (5N) HCl to neutralize any remaining pyridine. The funnel was shaken, and the product was extracted into $CHCl_3$. The bottom $CHCl_3$ layer containing product was isolated and washed in a separatory funnel with water (5 mL of 5% $NaHCO_3$ solution were added to neutralize any remaining HCl). The organic layer was then washed once more with plain distilled water. Isolated $CHCl_3$ layer was concentrated by rotary evaporation to obtain crude product. The crude product was dissolved in 10 mL of isopropanol (IPA) and was then added dropwise to a beaker containing 200 mL of deionized water containing 1% (v/v) MeOH with continuous stirring. Product separated out as an oil. The mixture was kept in ice bath for 20 minutes, and the top water layer was decanted. The oil was dissolved in THF and transferred into 200 mL round bottom flask. THF was removed by rotary evaporation at a maximum temperature of 80° C. and 4 mbar to remove all residual solvents. The resulting product was dried in a vacuum oven at 60° C. for 24 h to give a purified product as a viscous oil (~87% yield). The purified product (a mixture of di- and mono-substituted products) was characterized by GPC, elemental analysis, for fluorine, and Hi-Res TGA. Appearance: off-white viscous liquid. Weight Average molecular weight (polystyrene equivalent)=10757 g/mol. Polydispersity, PD: 1.33. Elemental analysis: F: 11.29% (theory: 14.21%). Thermal decomposition temperature (TGA), $N_2$, at 10% (w/w) loss: 354° C.

Synthesis of Compound 5

Glassware used for the synthesis was dried in an oven at 110° C. overnight. To a 2-necked 100 mL oven dried round bottom flask equipped with a stir bar was added 10 g (5 mmol) of hydrogenated-hydroxyl terminated polyisoprene (HHTPI diol, MW=2000). The flask with the diol was degassed overnight at 60° C. with gentle stirring and then purged with dry $N_2$ the following day. At this time, the heating was turned off. A 100 mL graduated cylinder was charged with 50 mL anhydrous $CHCl_3$, sealed by a rubber septa, and purged with dry $N_2$. The $CHCl_3$ was transferred to the 2-necked flask via a cannula, and the diol was stirred vigorously to dissolve in the solvent. At this time, excess anhydrous pyridine (0.75 g, 9 mmol) was added to the HHTPI diol solution using a plastic syringe, and the resulting mixture was stirred to dissolve all materials. Another oven dried 2-necked 250 mL flask was charged with perfluoroheptanoyl chloride (4.51 g, 12 mmol), sealed with rubber septa, and degassed for 5 minutes, and then purged with nitrogen. At this time, 22 mL of anhydrous $CHCl_3$ was added using a graduated cylinder and a cannula to transfer the solvent to the 250 mL 2-necked flask containing the perfluoroheptanoyl chloride. The resulting mixture was stirred at room temperature to dissolve the acid chloride. An addition funnel was fitted to this flask, and the HHTPI-pyridine solution in $CHCl_3$ was added into the addition funnel. $N_2$ flow was adjusted through the reactor to a slow and steady rate. HLBH-Pyridine solution was added continuously drop-wise to the acid chloride solution at room temperature over a period of ~4 hours. Stirring was maintained at a sufficient speed to achieve good mixing of reagents. After completing addition of the HHTPI diol, the addition funnel was replaced with an air condenser, and the 2-necked flask was immersed in an oil bath on a heater fitted with a thermocouple unit. The temperature was raised to 50° C., and the reaction continued at this temperature under $N_2$ for 24 h.

After the reaction, heating and stirring were turned off. The reaction flask was removed, and its contents were poured into a round bottom flask. $CHCl_3$ was removed by rotary evaporation. Upon concentration, a dense precipitate (pyridine salts) formed. THF was added to dissolve the product, and the precipitated pyridine salts were removed by filtration using a coarse Whatman Filter paper (No 4). Pyridine salts are insoluble in THF. THF was removed by rotary evaporation. The crude product was dissolved in 100 mL of $CHCl_3$ and was poured into a separatory funnel. 150 mL of water were added, followed by the addition of 5 mL of (5N) HCl to neutralize any remaining pyridine. The funnel was shaken, and the product was extracted into $CHCl_3$. The bottom $CHCl_3$ layer containing product was isolated and washed in separatory funnel with water (5 mL of 5% $NaHCO_3$ solution were added to neutralize any remaining HCl). The organic layer was then washed once more with plain distilled water. Isolated $CHCl_3$ layer was concentrated by rotary evaporation to obtain crude product. The crude product was dissolved in 10 mL of isopropanol (IPA) and was added dropwise to a 1 L beaker containing 200 mL of deionized water containing 1% (v/v) MeOH with continuous stirring. Product separated out as an oil. The mixture was kept in ice bath for 20 minutes, and the top water layer was decanted. The oil was dissolved in THF and transferred into 200 mL round bottom flask. THF was removed by rotary evaporation at a maximum temperature of 80° C. and 4 mbar to remove all residual solvents. The resulting product was dried in a vacuum oven at 60° C. for 24 h to give a purified product as a colorless viscous oil (~99.9% yield). The purified product (a mixture of di- and mono-substituted products) was characterized by GPC, elemental analysis, for fluorine, and Hi-Res TGA. Appearance: colorless viscous liquid. Weight Average molecular weight (polystyrene equivalent)=12622 g/mol. Polydispersity, PD: 1.53. Elemental analysis: F: 13.50% (theory: 17.13%). Thermal decomposition temperature (TGA), $N_2$, at 5% (w/w) loss: 260° C.

Synthesis of Compound 6

Glassware used for the synthesis was dried in an oven at 110° C. overnight. To a 2-necked 1000 mL oven dried round bottom flask equipped with a stir bar was added 100 g (40 mmol) of Hydrogenated-hydroxyl terminated polybutadiene (HLBH diol, MW=2000). The flask with the diol was degassed overnight at 60° C. with gentle stirring and then purged with dry $N_2$ the following day. At this time, the heating was turned off. A 1000 mL graduated cylinder was charged with 415 mL anhydrous $CHCl_3$, sealed by a rubber septa, and purged with dry $N_2$. The $CHCl_3$ was transferred to the 2-necked flask via a cannula, and the diol was stirred vigorously to dissolve in the solvent. Now excess anhydrous pyridine (19.08 g, 241 mmol) was added to the HLBH diol solution using a plastic syringe, and the resulting mixture was stirred to dissolve all materials. Another oven dried 2-necked 1000 mL flask was charged with 38.45 g, (101 mmol) perfluoroheptanoyl chloride, sealed with rubber septa, and degassed for 5 minutes, and then purged with nitrogen. At this time, 277 mL of anhydrous $CHCl_3$ was added using a graduated cylinder and a cannula to transfer the solvent to the 1000 mL 2-necked flask containing the perfluoroheptanoyl chloride. The resulting mixture was stirred at room temperature to dissolve the acid chloride. An addition funnel was fitted to this flask, and the HLBH-pyridine solution in CHCL₃ was added into the addition funnel using a cannula. $N_2$ flow was adjusted through the reactor to a slow and steady rate. Continuous drop-wise addition of HLBH-Pyridine solution to the acid chloride solution was started at room temperature over a period of ~4 hours. Stirring was maintained at a sufficient speed to achieve good mixing of reagents. After completing addition of the HLBH, the addition funnel was replaced with an air condenser, and the 2-necked flask was immersed in an oil bath on a heater fitted with a thermocouple unit. The temperature was raised to 50° C., and the reaction continued at this temperature under $N_2$ for 24 h.

After the reaction, heating and stirring were turned off. The reaction flask was removed, and its contents were poured into a round bottom flask. $CHCl_3$ was removed by rotary evaporation. Upon concentration, a dense precipitate (pyridine salts) formed. THF was added to dissolve the product, and the precipitated pyridine salts were removed by filtration using a coarse Whatman Filter paper (No 4). Pyridine salts are insoluble in THF. THF was removed by rotary evaporation. The crude product was dissolved in 400 mL of $CHCl_3$ and was poured into a separatory funnel. 500 mL of water were added, followed by the addition of 20 mL of (5N) HCl to neutralize any remaining pyridine. The funnel was shaken, and the product was extracted into $CHCl_3$. The bottom $CHCl_3$ layer containing product was isolated, and washed in a separatory funnel with water (20 mL of 5% $NaHCO_3$ solution were added to neutralize any remaining HCl). The organic layer was then washed once more with plain distilled water. Isolated $CHCl_3$ layer was concentrated by rotary evaporation to obtain crude product. The crude product was dissolved in 20 mL of THF and was then added dropwise to a 4 L beaker containing 1200 mL of deionized water containing 1% (v/v) MeOH with continuous stirring. Product separated out as an oil. The mixture was kept in ice bath for 20 minutes, and the top hexane layer was decanted. The oil was dissolved in THF and transferred into 500 mL round bottom flask. THF was removed by rotary evaporation at a maximum temperature of 80° C. and 4 mbar to remove all residual solvents. The resulting product was dried in a vacuum oven at 60° C. for 24 h to give a purified product as a yellow viscous oil (~80% yield). The purified product (a mixture of di- and mono-substituted products) was characterized by GPC, elemental analysis for fluorine and Hi-Res TGA. Appearance: light yellow viscous liquid. Weight Average molecular weight (polystyrene equivalent)=6099 g/mol. Polydispersity, PD: 1.08. Elemental analysis: F: 12.84% (theory: 15.54%). Thermal decomposition temperature (TGA), $N_2$, at 5% (w/w) loss: 343° C.

Synthesis of Compound 7

Glassware used for the synthesis was dried in an oven at 110° C. overnight. To a 2-necked 1000 mL oven dried round bottom flask equipped with a stir bar was added 65 g (63 mmol) of YMer-diol (MW=1000). The flask with the diol was degassed overnight at 60° C. with gentle stirring and then purged with dry $N_2$ the following day. At this time, heating was turned off. A 1000 mL graduated cylinder was charged with 374 mL anhydrous $CHCl_3$, sealed by rubber septa, and purged with dry $N_2$. The $CHCl_3$ was transferred to the 2-necked flask via a cannula, and the diol was stirred vigorously to dissolve in the solvent. Excess anhydrous pyridine (30 g, 375 mmol) was added to the YMer-diol solution using a plastic syringe, the resulting stir to dissolve all materials. Another oven dried 2-necked 1000 mL flask was charged with 59.82 g (156 mmol) of perfluoroheptanoyl chloride, sealed with rubber septa, and degassed for 5 minutes, then purged with nitrogen. At this time 250 mL of anhydrous $CHCl_3$ were added using a graduated cylinder and cannula to transfer the solvent to the 1000 mL 2-necked flask containing the perfluoroheptanoyl chloride. The resulting mixture was stirred at room temperature to dissolve the acid chloride. An addition funnel was fitted to this flask and using a cannula transfer the YMer-diol-pyridine solution in $CHCl_3$ into the addition funnel. $N_2$ flow through the reactor was adjusted to a slow and steady rate. YMer-diol-pyridine solution was added drop-wise, continuously to the acid chloride solution at room temperature over a period of ~4 hours. Stirring was maintained at a sufficient speed to achieve good mixing of reagents. After completing the addition of the YMer-diol-pyridine solution, the addition funnel was replaced with an air condenser, and the 2-necked flask was immersed in an oil bath placed on a heater fitted with a thermocouple unit. The temperature was raised to 40° C., and the reaction continued at this temperature under $N_2$ for 24 h.

After the reaction, heating and stirring were turned off. The reaction flask was removed, and the contents were poured into a round bottom flask. $CHCl_3$ was removed by rotary evaporation. Upon concentration, a dense precipitate (pyridine salts) formed. THF was added to dissolve the product. The flask was cooled in an ice bath for 20 minutes, at which time, the precipitated pyridine salts were removed by gravity filtration using a coarse Whatman Filter paper (No 4). Pyridine salts are insoluble in THF. THF was removed by rotary evaporation. The resulting crude product was dissolved in a minimum quantity of Isopropanol (IPA), and this solution was added to 700 mL of hexanes in a beaker with a stir bar. An oil separated out. The top layer was decanted and washed once with 200 mL of hexanes. The residue was then dissolved in 200 mL of THF and transferred to a 500 mL round bottom flask. Rotary evaporation of the solvents at a maximum temperature of 75° C. and 4 mbar vacuum furnished an oil, which was then transferred to a wide mouth jar and further dried for 24 h at 60° C. under vacuum to yield the pure product which solidifies upon cooling at room temperature to an off white waxy semi-solid (Yield 82%). The purified product was characterized by GPC (Molecular Weight based on Polystyrene Standards), elemental analysis for fluorine, $^{19}F$ NMR, $^1H$ NMR, FTIR and TGA. Appearance: waxy semi-solid. Weight Average molecular weight (polystyrene equivalent)=2498 g/mol. Polydispersity: 1.04. Elemental Analysis: F: 27.79% (theory: 28.54%). $^{19}F$ NMR ($CDCl_3$, 400 MHz): δ ppm −81.3 (m, $CF_3$), −118.88 (m, $CF_2$), −122.37 (m, $CF_2$), −123.28 (m, $CF_2$), −126 (m, $CF_2$). $^1H$ NMR ($CDCl_3$, 400 MHz): δ ppm 0.83 (t, $CH_3CH_2$), 1.44 (q, $CH_2CH_3$), 3.34 (m, $CH_2$), 3.51 (m, $CH_2$), 3.54 (m, $CH_2$), 4.30 (m, $CH_2COO$—). FTIR, neat ($cm^{-1}$): 2882 (CH2), 1783 (O—C═O, ester), 1235, 1203, 1143, 1104 ($CF_3$, $CF_2$). Thermal decomposition temperature (TGA), $N_2$, at ca. 10% (w/w) loss=352° C.

Synthesis of Compound 8

Compound 8 was prepared according to a procedure similar to that used for the preparation of compound 7.

Glassware used for the synthesis was dried in an oven at 110° C. overnight. To a 2-necked 1000 mL oven dried round bottom flask equipped with a stir bar was added 60 g (59 mmol) of YMerOH-triol (MW=1014). The flask with the triol was degassed overnight at 60° C. with gentle stirring and then purged with dry $N_2$ the following day. Heating was turned off. A 1000 mL graduated cylinder was charged with 435 mL anhydrous $CHCl_3$, sealed with rubber septa, and purged with dry $N_2$. The $CHCl_3$ liquid was transferred to the 2-necked flask via a cannula, and the triol was stirred vigorously to dissolve in the solvent. Excess anhydrous pyridine (37 g, 473 mmol) was added to the YMer-triol solution using a plastic syringe, the resulting mixture was stirred to dissolve all materials. Another oven dried 2-necked 1000 mL flask was charged with 84.88 g (222 mmol) of perfluoroheptanoyl chloride, sealed with rubber septa, and degassed for 5 minutes, then purged with nitrogen. 290 mL of anhydrous $CHCl_3$ were added using a graduated cylinder and cannula to transfer the solvent to the 1000 mL 2-necked flask containing the perfluoroheptanoyl chloride. The mixture was stirred at room temperature to dissolve the acid chloride. An addition funnel was fitted to this flask, and the YMerOH-triol-pyridine solution in $CHCL_3$ was transferred to the addition funnel using a cannula. $N_2$ flow through the reactor was adjusted to a slow and steady rate. YMerOH-triol-pyridine solution was added continuously drop-wise to the acid chloride solution at room temperature over a period of ~4 hours. Stirring was maintained at a sufficient speed to achieve good mixing of reagents. After completing the addition of the YMer-triol-pyridine solution, the addition funnel was replaced with an air condenser, and the 2-necked flask was immersed in an oil bath placed on a heater fitted with a thermocouple unit. The temperature was raised to 40° C., and the reaction was continued at this temperature under $N_2$ for 24 h.

The resulting product was purified in a similar manner to compound 7 described above. The purification involved rotary evaporation of $CHCl_3$, addition of THF, and separation of the pyridine salts by filtration. The product was then precipitated in isopropanol (IPA)/Hexanes, washed as described above for compound 7, and dried at 75° C. and 4 mbar. Final drying was also done under vacuum at 60° C. for 24 h to yield an oil (Yield 78.2%). The purified product was characterized by GPC (Molecular Weight based on Polystyrene Standards), elemental analysis for fluorine, $^{19}F$ NMR, $^1H$ NMR, FTIR, and TGA. Appearance: light yellow, viscous oil. Weight Average molecular weight (polystyrene equivalent)=2321 g/mol. Polydispersity: 1.06. Elemental Analysis: F: 35.13% (theory: 36.11%). $^{19}F$ NMR ($CDCl_3$, 400 MHz): δ ppm −81.30 (m, $CF_3$), −118.90 (m, $CF_2$), −122.27 (m, $CF_2$), −123.07 (m, $CF_2$), −126.62 (m, $CF_2$). $^1H$ NMR ($CDCl_3$, 400 MHz): δ ppm 0.83 (t, $CH_3CH_2$), 1.44 (q, $CH_2CH_3$), 3.34 (m, $CH_2O$), 3.41 (m, $CH_2$'s), 3.74 (m, $CH_2$), 4.30 (m, $CH_2COO$—). FTIR, neat ($cm^{-1}$): 2870 ($CH_2$), 1780 (O—C=O, ester), 1235, 1202, 1141, 1103 ($CF_3$, $CF_2$). Thermal decomposition temperature (TGA), $N_2$, at ca. 10% (w/w) loss=333° C.

Synthesis of Compound 9

Compound 9 was prepared according to a procedure similar to that used for the preparation of compound 7.

Glassware used for the synthesis was dried in an oven at 110° C. overnight. To a 2-necked 1000 mL oven dried round bottom flask equipped with a stir bar was added 50 g (65 mmol) of XMer-Tetraol (MW=771). The flask with the tetraol was degassed overnight at 60° C. with gentle stirring and then purged with dry $N_2$ the following day. Heating was turned off. A 1000 mL graduated cylinder was charged with 400 mL anhydrous $CHCl_3$, sealed with rubber septa, and purged with dry $N_2$. $CHCl_3$ was transferred to the 2-necked flask via a cannula, and the tetraol was stirred vigorously to dissolve in the solvent. Excess anhydrous pyridine (51.30 g, 649 mmol) was added to the XMer-Tetraol solution using a plastic syringe, and the resulting mixture was stirred to dissolve all materials. Another oven dried 2-necked 1000 mL flask was charged with 111.63 g (292 mmol) of perfluoroheptanoyl chloride, sealed with rubber septa, and degassed for 5 minutes, and then purged with nitrogen. 300 mL of anhydrous $CHCl_3$ were added using a graduated cylinder and cannula to transfer the solvent to the 1000 mL 2-necked flask containing perfluoroheptanoyl chloride. The resulting mixture was stirred at room temperature to dissolve the acid chloride. An addition funnel was attached to this flask, and the XMer-tetraol-pyridine solution in $CHCL_3$ was transferred into the addition funnel via a cannula. $N_2$ flow through the reactor was adjusted to a slow and steady rate. XMer-tetraol-pyridine solution was added continuously drop-wise to the acid chloride solution at room temperature over a period of ~4 hours. Stirring was maintained at a sufficient speed to achieve good mixing of reagents. After completing addition of the XMer-tetraol-pyridine solution, the addition funnel was replaced with an air condenser, and the 2-necked flask was immersed in an oil bath placed on a heater fitted with a thermocouple unit. The temperature was raised to 40° C., and the reaction continued at this temperature under $N_2$ for 24 h.

The resulting product was purified in a similar manner to compound 7 described above, where the $CHCl_3$ was removed by rotary evaporation, addition of THF, and the separation of pyridine salts by filtration after adding THF. The product was then precipitated in isopropanol (IPA)/hexanes, washed as described for compound 7, and dried at 75° C. and 4 mbar. Final drying was also done under vacuum at 60° C. for 24 h to yield an oil (Yield 80.9%). The purified product was characterized by GPC (Molecular Weight based on Polystyrene Standards), elemental analysis for fluorine, $^{19}F$ NMR, $^1H$ NMR, FTIR, and TGA. Appearance: light yellow, viscous oil. Weight Average molecular weight (polystyrene equivalent)=2410 g/mol. Polydispersity: 1.04. Elemental Analysis: F: 44.07% (theory: 45.85%). $^{19}F$ NMR ($CDCl_3$, 400 MHz): δ ppm −81.37 (m, $CF_3$), −118.89 (m, $CF_2$), −122.27 (m, $CF_2$), −123.06 (m, $CF_2$), −26.64 (m, $CF_2$). $^1H$ NMR ($CDCl_3$, 400 MHz): δ ppm 3.36 (m, $CH_2$'s), 3.75 (m, $CH_2O$), 4.39 (m, $CH_2O$), 4.49 (m, $CH_2COO$—). FTIR, neat ($cm^{-1}$): 2870 ($CH_2$), 1780 (O—C=O, ester), 1235, 1202, 1141, 1103 ($CF_3$, $CF_2$). Thermal decomposition temperature (TGA), $N_2$, at ca. 10% (w/w) loss=327° C.

Compounding

Compounds of the invention can be used to form an admixture with a base polymer (e.g., COP, such as Zeonex® 690R, or COC, such as TOPAS® (e.g., COC 8007S or COC 6013S)) as described herein for compound 6.

Compound 6 was compounded with COP resin Zeonex® 690R, TOPAS® COC 8007S or 6013S in 15 mL DSM Xplore twin screw microcompounder in a batch mode to extrude rods. Compounding was performed by filling at 75 rpm and processing at 100 rpm at 250° C., 280° C., or 300° C. under $N_2$. The processing of COC 8007S was performed at 250° C. The processing of COC 6013S was performed at 300° C. The cycle time was 3 minutes.

Resulting rods were analyzed visually for clarity and by XPS analysis for surface modification (% F). Elemental analysis was used to determine actual concentration of the surface-modifying macromolecule in resin and to compare the analysis results to the theoretical target concentration.

Table 1 shows the results of the XPS elemental composition analysis of the surface of the rods prepared from an admixture of Zeonex® 690R with 0.5% (w/w) of compound 6.

TABLE 1

| Element | n = 1 | n = 2 | n = 3 | Average | SD |
|---|---|---|---|---|---|
| C1s | 91.21 | 89.34 | 89.83 | 90.13 | 0.97 |
| F1s | 7.37 | 8.48 | 8.21 | 8.02 | 0.58 |

TABLE 1-continued

| Element | n = 1 | n = 2 | n = 3 | Average | SD |
|---|---|---|---|---|---|
| N1s | 0 | 0 | 0 | 0.00 | 0.00 |
| O1s | 1.43 | 2.18 | 1.96 | 1.86 | 0.39 |
| Si2p | 0 | 0 | 0 | 0.00 | 0.00 |

Table 2 shows the results of the XPS analysis of COC-8007S rods with surface-modifying macromolecules of the invention at various concentrations (noted as a (w/w) percentage) (n=2).

TABLE 2

| Formulation | % F (Average) | SD |
|---|---|---|
| 0.5% (w/w) compound 6 | 5.41 | 0.83 |
| 1% (w/w) compound 6 | 8.76 | 0.98 |
| 0.5% (w/w) compound 3 | 5.12 | 0.26 |
| 1% (w/w) compound 3 | 5.79 | 1.45 |
| 0.5% (w/w) compound 4 | 6.15 | 0.57 |
| 1% (w/w) compound 4 | 5.25 | 0.01 |
| 0.5% (w/w) compound 5 | 9.38 | 1.01 |
| 1% (w/w) compound 5 | 8.98 | 0.53 |
| 0.75% (w/w) compound 7 | 19.74 | 1.09 |

A comparison of the target concentration to the actual concentration of the surface-modifying macromolecules in COC 8007S rods is provided in Table 3.

TABLE 3

| Formulation | Target Conc (%) | Actual Conc (%) |
|---|---|---|
| 0.5% (w/w) compound 6 | 0.5 | 0.4 |
| 1% (w/w) compound 6 | 1 | 0.9 |
| 0.5% (w/w) compound 3 | 0.5 | 0.4 |
| 1% (w/w) compound 3 | 1 | 0.72 |
| 0.5% (w/w) compound 4 | 0.5 | 0.6 |
| 1% (w/w) compound 4 | 1 | 0.64 |
| 0.5% (w/w) compound 5 | 0.5 | 0.4 |
| 1% (w/w) compound 5 | 1 | 0.8 |
| 0.75% (w/w) compound 7 | 0.75 | 0.44 |

Table 4 shows the results of the XPS analysis of COC-6013S rods with surface-modifying macromolecules of the invention at various concentration (noted as a (w/w) percentage) (n=2).

TABLE 4

| Formulation | % F (Average) | SD |
|---|---|---|
| 0.5% (w/w) compound 6 | 5.94 | 2.20 |
| 1% (w/w) compound 6 | 6.29 | 0.92 |
| 2% (w/w) compound 6 | 9.72 | 1.14 |
| 0.5% (w/w) compound 4 | 4.29 | 0.76 |
| 1% (w/w) compound 4 | 5.90 | 0.21 |
| 0.5% (w/w) compound 3 | 3.99 | 0.53 |

Table 5 shows a comparison of the target to actual concentration of the surface-modifying macromolecules in COC 6013S rods.

TABLE 5

| Formulation | Target Conc. (%) | Actual Conc. (%) |
|---|---|---|
| 0.5% (w/w) compound 6 | 0.5 | 0.8 |
| 1% (w/w) compound 6 | 1 | 0.84 |
| 2% (w/w) compound 6 | 2 | 1 |
| 0.5% (w/w) compound 4 | 0.5 | 0.41 |
| 1% (w/w) compound 4 | 1 | 0.74 |
| 0.5% (w/w) compound 3 | 0.5 | 0.5 |

Measurement of Immobilization and/or Denaturation of a Biologic on the Surface

The capability of the surface of an article of the invention reducing or preventing immobilization of a biologic can be compared to that of the surface of an article made from the same base polymer but lacking a surface-modifying macromolecule. In a non-limiting example, a vessel prepared from an admixture of a base polymer and a surface-modifying macromolecule ("Vessel") can be charged with a solution (e.g., aqueous solution) of a biologic (e.g., interferon β, a monoclonal antibody, a fusion protein (e.g., abatacept), an siRNA, or DNA (e.g., plasmid)) of predetermined concentration. Vessel can then be sealed, e.g., under inert atmosphere (e.g., under Ar or $N_2$). After storage of the biologic solution inside sealed Vessel for a period of time (e.g., 1 day, 3 days, 1 week, 2 weeks, 3 weeks, 1 month, 2 months, 3 months, 0.5 years, 0.75 years, 1 year, etc) at room temperature or at a lower temperature (e.g., at 4° C. or at 0° C.) under ambient light (e.g., fluorescent light) or in the dark, the solution stored inside Vessel can be assessed for the total protein or nucleic acid concentration (e.g., using UV-Vis spectrometry or particle analyzer as known in the art). The change in the concentration of the biologic over time inside Vessel can then be compared to the change in the concentration of the biologic over time inside a vessel lacking a surface-modifying macromolecule ("Control Vessel"). The magnitude of the decrease of the biologic concentration in Vessel can be at least 5% lower (e.g., at least 10% lower, at least 20% lower, at least 30% lower, at least 40% lower, or at least 50% lower) than that of the biologic concentration in Control Vessel over the same period of time, provided that the solutions were stored at the same temperature and light conditions.

Other Embodiments

Various modifications and variations of the described materials and methods of use of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

What is claimed is:

1. A compound of formula (I):

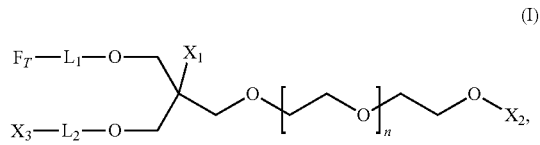

(I)

wherein
each $F_T$ is independently a surface active group selected from the group consisting of polydimethylsiloxanes, hydrocarbons, polyfluoroorgano, and combinations thereof;
$X_1$ is H, $CH_3$, or $CH_2CH_3$;
each of $X_2$ and $X_3$ is independently H, $CH_3$, $CH_2CH_3$, or $F_T$;
each of $L_1$ and $L_2$ is independently a bond, an oligomeric linker, or a linker with two terminal carbonyls; and
n is an integer from 5 to 50.

2. The compound of claim 1, wherein each of $L_1$ and $L_2$ is a bond.

3. The compound of claim 1, wherein each of $L_1$ and $L_2$ is a linker with two terminal carbonyls.

4. The compound of claim 1, wherein each of $L_1$ and $L_2$ is an oligomeric linker.

5. The compound of claim 4, wherein said oligomeric linker comprises (alkylene oxide)$_z$, wherein z is an integer from 2 to 20.

6. The compound of claim 5, wherein said oligomeric linker comprises (ethylene oxide)$_z$, wherein z is an integer from 2 to 20.

7. The compound of claim 1 having a structure of formula (I-A):

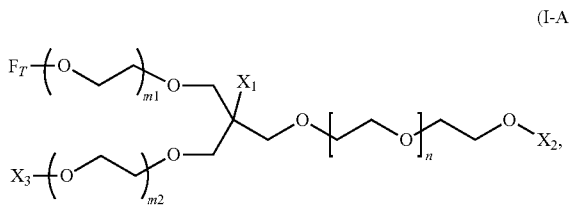

(I-A)

wherein each of m1 and m2 is independently an integer from 0 to 50.

8. The compound of claim 7, wherein m1 is 5, 6, 7, 8, 9, or 10.

9. The compound of claim 7 or 8, wherein m2 is 5, 6, 7, 8, 9, or 10.

10. The compound of claim 7, wherein m1=m2.

11. The compound of claim 10, wherein each of m1 and m2 is 6.

12. The compound of claim 7, wherein each of m1 and m2 is 0.

13. The compound of claim 7, wherein n is 5, 6, 7, 8, 9, or 10.

14. The compound of claim 13, wherein n is 8.

15. The compound of claim 1, wherein $X_2$ is H, $CH_3$, or $CH_2CH_3$.

16. The compound of claim 1, wherein $X_2$ is $F_T$.

17. The compound of claim 1, wherein $X_3$ is $F_T$.

18. The compound of claim 1, wherein each $F_T$, when present, is independently a polyfluoroorgano group.

19. The compound of claim 1, wherein each $F_T$, when present, is independently —(O)$_q$—[C(=O)]$_r$—(CH$_2$)$_o$(CF$_2$)$_p$CF$_3$,
wherein
q is 0, and r is 1, or q is 1, and r is 0;
o is from 0 to 2; and
p is from 0 to 10;
provided that said compound does not contain —O—O—.

20. The compound of claim 1, wherein each $F_T$ comprises (CF$_2$)$_5$CF$_3$.

21. The compound of claim 1, wherein $X_1$ is $CH_2CH_3$.

22. The compound of claim 1, wherein said compound has a theoretical molecular weight of less than 10,000 Daltons.

23. The compound of claim 1, wherein said compound has a thermal degradation temperature from 200° C. to 400° C.

24. A compound of formula (II),

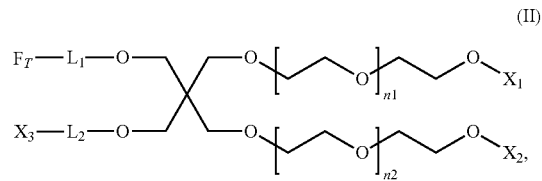

(II)

wherein
each $F_T$ is independently a surface active group selected from the group consisting of polydimethylsiloxanes, hydrocarbons, polyfluoroorgano, and combinations thereof;
each of $X_1$, $X_2$, and $X_3$ is independently H, $CH_3$, $CH_2CH_3$, or $F_T$;
each of $L_1$ and $L_2$ is independently a bond, an oligomeric linker, or a linker with two terminal carbonyls; and
each of n1 and n2 is independently an integer from 3 to 50.

25. The compound of claim 24, wherein each of $L_1$ and $L_2$ is a bond.

26. The compound of claim 24, wherein each of $L_1$ and $L_2$ is a linker with two terminal carbonyls.

27. The compound of claim 24, wherein each of $L_1$ and $L_2$ is an oligomeric linker.

28. The compound of claim 27, wherein said oligomeric linker comprises (ethylene oxide)$_z$, wherein z is an integer from 2 to 20.

29. The compound of claim 24, having a structure of formula (II-A),

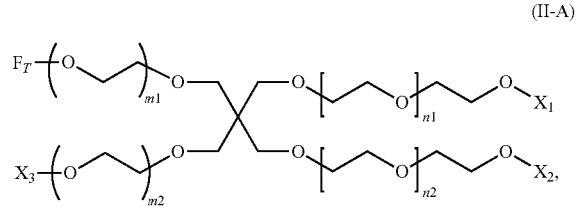

(II-A)

wherein each of m1 and m2 is independently an integer from 0 to 50.

30. The compound of claim 29, wherein m1 is 5, 6, 7, 8, 9, or 10.

31. The compound of claim 29 or 30, wherein m2 is 5, 6, 7, 8, 9, or 10.

32. The compound of claim 29, wherein m1=m2.

33. The compound of claim 32, wherein each of m1 and m2 is from 2 to 6.

34. The compound of claim 33, wherein each of m1 and m2 is 3.

35. The compound of claim 29, wherein the sum of n1, n2, m1, and m2 is an integer from 5 to 15.

36. The compound of claim 24, wherein n1 is 4.

37. The compound of claim 24, wherein n2 is 5.

38. The compound of claim 24, wherein $X_2$ is H, $CH_3$, or $CH_2CH_3$.

39. The compound of claim 24, wherein $X_2$ is $F_T$.

40. The compound of claim 24, wherein $X_1$ is $F_T$.

41. The compound of claim 24, wherein $X_3$ is $F_T$.

42. The compound of claim 24, wherein each $F_T$, when present, is independently a polyfluoroorgano group.

43. The compound of claim 24, wherein each $F_T$, when present, is independently $-(O)_q-[C(=O)]_r-(CH_2)_o(CF_2)_pCF_3$, wherein q is 0, and r is 1, or q is 1, and r is 0;

o is from 0 to 2; and p is from 0 to 10;

provided that said compound does not contain —O—O—.

44. The compound of claim 24, wherein each $F_T$ comprises $-(CF_2)_5CF_3$.

45. A compound of formula (IV):

$$G-(A)_m-[B-A]_n-B-G \quad (IV)$$

wherein (i) A comprises a polysiloxane;

(ii) B comprises is a bond, an oligomeric linker, or a linker with two terminal carbonyls; and (iii) G is (a) a surface active group comprising a polyfluoroorgano group or (b) H;

(iv) n is an integer from 1 to 10; and (v) m is 0 or 1;

provided that at least one G is said surface active group comprising said polyfluoroorgano group.

46. The compound of claim 45, wherein A comprises a triblock copolymer PEG-b-(polysiloxane)-b-PEG.

47. The compound of claim 45, wherein B is a bond.

48. The compound of claim 45, wherein B is a linker with two terminal carbonyls.

49. The compound of claim 45, wherein B is norbornenedicarbonyl or terephthaloyl.

50. The compound of claim 45, wherein said surface active group is a polyfluoroorgano.

51. The compound of claim 45, wherein said surface active group is $-(O)_q-[C(=O)]_r-(CH_2)_o(CF_2)_pCF_3$, wherein q is 0, and r is 1, or q is 1, and r is 0;

o is from 0 to 2; and p is from 0 to 10;

provided that said compound does not contain —O—O—.

52. The compound of claim 45, wherein n is 1 or 2.

53. The compound of claim 45, wherein m is 0.

54. A composition comprising the compound of claim 45.

55. An admixture comprising a base polymer and from 0.005% to 15% (w/w) of the compound of claim 1 or the composition of claim 54.

56. The admixture of claim 55, wherein said base polymer is selected from the group consisting of polyurethanes, polysulfones, polycarbonates, polyesters, polyamides, polyimides, polyetherimides, polyalkylenes, polysilicone, polysaccharides and copolymers thereof and blends thereof.

57. The admixture of claim 56, wherein said base polymer is selected from the group consistin of polyethylene, polypropylene, polystyrene, polybutadiene, polyisoprene, poly(acrylonitrile-butadienestyrene), cellulose, cellulose acetates, cellulose diacetates, cellulose triacetates, polyethylene terephtahate.

58. The admixture of claim 56, wherein said base polymer is selected from the group consistin of polyamides, polyurethanes, polysilicones, polysulfones, polyalkylenes, polyesters, polypeptides, and polysaccharides.

59. The admixture of claim 56, wherein said base polymer is selected from the group consisting of polyurethanes, polysulfones, polycarbonates, polyesters, polyamides, polyethylene, polypropylene, polystyrene, polysilicone, poly(acrylonitrile-butadiene-styrene), polybutadiene, polyisoprene, polymethylmethacrylate, polyvinylacetate, polyacrylonitrile, polyvinyl cloride, polyethylene terephtahate, cellulose, cellulose acetates, and cellulose di- and tri-acetates.

* * * * *